US012177053B2

(12) United States Patent
Wong et al.

(10) Patent No.: US 12,177,053 B2
(45) Date of Patent: *Dec. 24, 2024

(54) COMMUNICATIONS DEVICE, INFRASTRUCTURE EQUIPMENT, WIRELESS COMMUNICATIONS NETWORK AND METHODS

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/372,273

(22) Filed: Sep. 25, 2023

(65) Prior Publication Data
US 2024/0015056 A1     Jan. 11, 2024

Related U.S. Application Data

(63) Continuation of application No. 17/509,083, filed on Oct. 25, 2021, now Pat. No. 11,770,280, which is a
(Continued)

(30) Foreign Application Priority Data

Jan. 11, 2016   (EP) .................................... 16150823

(51) Int. Cl.
H04L 27/26      (2006.01)
H04L 5/00       (2006.01)
(Continued)

(52) U.S. Cl.
CPC ...... H04L 27/26025 (2021.01); H04L 5/0007 (2013.01); H04L 5/0091 (2013.01);
(Continued)

(58) Field of Classification Search
None
See application file for complete search history.

(56) References Cited

U.S. PATENT DOCUMENTS 9,820,281 B1    11/2017  Werner
10,517,095 B2*  12/2019  Wong ................. H04L 27/2602
(Continued)

FOREIGN PATENT DOCUMENTS

KR    20160111927 A    9/2016
KR    20180044996 A    5/2018
(Continued)

OTHER PUBLICATIONS

Office Action issued in German Application 11 2016 000 268.8 dated Dec. 3, 2018.
(Continued)

Primary Examiner — Otis L Thompson, Jr.
(74) Attorney, Agent, or Firm — XSENSUS LLP

(57) ABSTRACT

A user terminal configured to perform communication with an infrastructure equipment of a mobile communications network. The user terminal including a receiver configured to receive signals transmitted by the infrastructure equipment in accordance with a wireless access interface and a transmitter configured to transmit signals to the infrastructure equipment in accordance with the wireless access interface. The user terminal is configured to receive an indication on a downlink of the wireless access interface of one of a plurality of different subcarrier spacing which the communications device should use to transmit or to receive the signals representing the data.

20 Claims, 10 Drawing Sheets

Related U.S. Application Data continuation of application No. 16/721,967, filed on Dec. 20, 2019, now Pat. No. 11,272,508, which is a continuation of application No. 16/207,215, filed on Dec. 3, 2018, now Pat. No. 10,517,095, which is a continuation of application No. 15/835,499, filed on Dec. 8, 2017, now Pat. No. 10,182,443, which is a continuation of application No. 15/615,511, filed on Jun. 6, 2017, now Pat. No. 9,867,191, which is a continuation of application No. PCT/EP2016/082762, filed on Dec. 28, 2016.

(51) Int. Cl.
*H04W 72/0453* (2023.01)
*H04W 72/23* (2023.01)
*H04B 17/318* (2015.01)
*H04W 4/70* (2018.01)
*H04W 74/0833* (2024.01)

(52) U.S. Cl.
CPC ..... *H04L 27/2602* (2013.01); *H04W 72/0453* (2013.01); *H04W 72/23* (2023.01); *H04B 17/318* (2015.01); *H04W 4/70* (2018.02); *H04W 74/0833* (2013.01)

(56) References Cited

U.S. PATENT DOCUMENTS

| | | | |
|---|---|---|---|
| 10,812,219 B2 | 10/2020 | Rong et al. | |
| 11,770,280 B2* | 9/2023 | Wong ................ | H04L 27/26025 370/252 |
| 2010/0149961 A1 | 6/2010 | Lee et al. | |
| 2011/0150122 A1 | 6/2011 | Lindoff et al. | |
| 2013/0170464 A1 | 7/2013 | Hwang et al. | |
| 2013/0195002 A1 | 8/2013 | Walker et al. | |
| 2014/0126386 A1 | 5/2014 | Beale | |
| 2015/0003427 A1 | 1/2015 | Wan et al. | |
| 2015/0282178 A1 | 10/2015 | Kim et al. | |
| 2015/0334708 A1 | 11/2015 | Lee et al. | |
| 2015/0381330 A1* | 12/2015 | Chen ..................... | H04L 5/0048 370/329 |
| 2016/0254889 A1 | 9/2016 | Shattil | |
| 2016/0352551 A1 | 12/2016 | Zhang et al. | |
| 2017/0094547 A1 | 3/2017 | Yum et al. | |
| 2017/0164350 A1 | 6/2017 | Sun et al. | |
| 2017/0180095 A1 | 6/2017 | Xue et al. | |
| 2017/0201604 A1 | 7/2017 | Kim | |
| 2017/0265156 A1 | 9/2017 | Xue et al. | |
| 2018/0145802 A1* | 5/2018 | Hwang ................ | H04L 5/0005 |
| 2018/0199341 A1* | 7/2018 | Baldemair .......... | H04L 27/0008 |
| 2018/0220423 A1 | 8/2018 | Ly | |
| 2018/0220465 A1 | 8/2018 | Zhang | |
| 2018/0242317 A1* | 8/2018 | Marinier ............... | H04L 5/0092 |
| 2018/0248675 A1 | 8/2018 | Bhattad et al. | |
| 2018/0249509 A1 | 8/2018 | Yi | |
| 2018/0317241 A1 | 11/2018 | Xia et al. | |
| 2018/0367278 A1 | 12/2018 | Chatterjee et al. | |
| 2019/0013881 A1* | 1/2019 | Olesen .................. | H04B 15/02 |
| 2019/0021089 A1 | 1/2019 | Zhang | |
| 2019/0044639 A1 | 2/2019 | Ouchi | |
| 2019/0044690 A1 | 2/2019 | Yi et al. | |
| 2019/0058552 A1 | 2/2019 | Yang | |
| 2019/0081843 A1 | 3/2019 | Vaze | |
| 2019/0215812 A1 | 7/2019 | Lyu | |
| 2022/0303057 A1* | 9/2022 | Stern-Berkowitz ........................ | H04L 1/1692 |

FOREIGN PATENT DOCUMENTS

| | | | | |
|---|---|---|---|---|
| KR | 20180107100 A | | 10/2018 | |
| KR | 20180109998 A | | 10/2018 | |
| WO | WO-2005015801 A2 | * | 2/2005 | ............ H04B 17/24 |
| WO | WO-2011130954 A1 | * | 10/2011 | ....... H04L 29/06217 |
| WO | 2014/112907 A1 | | 7/2014 | |
| WO | WO-2015199824 A1 | * | 12/2015 | ........... H04B 7/0452 |

OTHER PUBLICATIONS

"Narrowband IoT—Random Access Design", Ericsson, 3GPP TSG-RAN1 #83, R1-157424, 10 Pages total, (Nov. 15-22, 2015).

"New Work Item: NarrowBand IOT (NB-IOT)", Qualcomm Incorporated, 3GPP TSG RAN Meeting #69 Phoenix, USA, Sep. 14-16, 2015, RP-151621, 8 Pages.

"Way Forward on NB-IoT", 3GPP TSG RAN WG1 #83 Anaheim, USA, Nov. 15-22, 2015, R1-157783, 3 Pages.

"NB-IoT Uplink Consideration", MediaTek Inc., 3GPP TSG RAN WG 1 Meeting #83 Anaheim, USA, Nov. 15-22, 2015, R1-156974, XP51022842A, 1-5 Pages.

"Design recommendations for NB-IoT", 3GPP TSG-RAN WG1 Meeting #83 Anaheim, USA, Nov. 15-22, 2015, R1-157746, XP51042262A, 1-6 Pages.

Harri Holma, et al., "LTE for UMTS OFDMA and SC-FDMA Based Radio Access", John Wiley and Sons, 2009, pp. 25-27 and Cover Page.

"3rd Generation Partnership Project; Technical Specification Group Radio Access Network; Evolved Universal Terrestrial Radio Access (E-UTRA); Physical layer procedures (Release 12)", 3GPP TS 36.213 V12.7.0 (Sep. 2015), 1-5 Pages.

Mediatek Inc: "NB-IoT Uplink Consideration", R1-156974, 3GPP TSG RAN WG1 Meeting #83, Nov. 15, 2015-Nov. 22, 2015, 5 pgs., Anaheim CA USA.

* cited by examiner

Single tone indicator changing the frequency resource allocation interpretation

TTI an integer multiple for different number of subcarrier transmissions

COMMUNICATIONS DEVICE, INFRASTRUCTURE EQUIPMENT, WIRELESS COMMUNICATIONS NETWORK AND METHODS

CROSS-REFERENCE TO RELATED APPLICATIONS

This application is a continuation of U.S. application Ser. No. 17/509,083, filed Oct. 25, 2021, which is a continuation of U.S. application Ser. No. 16/721,967, filed Dec. 20, 2019 (now U.S. Pat. No. 11,272,508), which is a continuation of U.S. application Ser. No. 16/207,215, filed Dec. 3, 2018 (now U.S. Pat. No. 10,517,095), which is a continuation of U.S. application Ser. No. 15/835,499, filed Dec. 08, 2017 (now U.S. Pat. No. 10,182,443), which is a continuation of U.S. application Ser. No. 15/615,511, filed Jun. 6, 2017 (now U.S. Pat. No. 9,867,191), which is a continuation of International Application No. PCT/EP2016/082762, filed Dec. 28, 2016, which claims priority to European patent application 16150823.9, filed Jan. 11, 2016, the contents of each are herein incorporated by reference.

BACKGROUND

Field of Disclosure

The present disclosure relates to communications devices, which are configured to transmit uplink signals to and/or receive downlink signals from an infrastructure equipment of a mobile communications network via a wireless access interface, which is configured to include on the uplink a plurality of different subcarrier spacings. The present technique also relates to infrastructure equipment and methods of communicating.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data.

It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to one example embodiment of the present technique, a communications device is configured to transmit signals to and/or receive signals from an infrastructure equipment of a mobile communications network. The communications device comprises a receiver, a transmitter and a controller. The receiver is configured to receive signals transmitted by the infrastructure equipment in accordance with a wireless access interface, the transmitter is configured to transmit signals to the infrastructure equipment in accordance with the wireless access interface, and the controller is configured to control the transmitter and the receiver to transmit data to the infrastructure equipment via an uplink of the wireless access interface or to receive data on the downlink of the wireless access interface. The wireless access interface can provide a plurality of different spacings of subcarriers for transmitting signals representing the data on the uplink or for receiving the signals representing the data on the downlink. The controller is configured in a combination with the transmitter and the receiver, when the infrastructure equipment identifies a requirement to provide communications resources of the wireless access interface on the uplink for the communications device to transmit data to the infrastructure equipment or on the downlink for the communications device to receive data from the infrastructure equipment, to receive an indication on a downlink of the wireless access interface of one of the plurality of different subcarrier spacings which the communications device should use to transmit or to receive the signals representing the data, the indicated subcarrier spacing also determining whether the communications device should use a single subcarrier or multiple subcarriers.

Embodiments of the present technique can provide an arrangement in which a subcarrier spacing can be selected for a communications device by the infrastructure equipment in response to a request for communications resources, which can be restricted for single subcarrier operation, which although reducing a data communications bandwidth compared to a multiple subcarrier allocation can increase a range for wireless communications by increasing a power spectral density of the transmitted signal. Accordingly improved uplink communications can be provided for example for communications devices located indoors.

According to another example embodiment of the present technique, there is provided a communications device configured to transmit signals to and/or receive signals from an infrastructure equipment of a mobile communications network. The communications device comprises a receiver configured to receive signals transmitted by the infrastructure equipment in accordance with a wireless access interface, a transmitter configured to transmit signals to the infrastructure equipment in accordance with the wireless access interface, and a controller configured to control the transmitter and the receiver to transmit data to the infrastructure equipment via an uplink of the wireless access interface or to receive data on the downlink of the wireless access interface. The wireless access interface includes communications resources for allocation to the communications device on the uplink and the downlink, the communications resources comprising frequency resources of a predetermined number of subcarriers, one or more of which can be allocated to the communications device, and time resources in which the wireless access interface is divided into predetermined time units. The communications device is configured, when the infrastructure equipment identifies a requirement to provide communications resources of the wireless access interface on the uplink or on the downlink, to receive an indication on a downlink of the wireless access interface of one or more of the subcarriers allocated to the communications device for receiving or transmitting the data, and a transmission time interval representing a number of the time units within which a transport block of the data is to be transmitted or to be received, and the transmission time interval can vary as a number of the time units as a function of allocated communications resource, for example, the number of the one or more subcarriers allocated to the communications device.

Embodiments of a further aspect of the present technique can provide an arrangement of a communications device and an infrastructure equipment to signal efficiently an indication of a transmission time interval with a number of subcarriers which have been allocated to the communications device, because for a given transport block, the transmission time interval can vary depending on, for example, a number of one or more subcarriers of a wireless access interface which have been allocated to the communications device out of a predetermined maximum. Example techniques for signalling the transmission time interval according to the embodiments presented below, can provide an efficient use of communications resources to indicate to the communications device the transmission time interval which is to be used.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
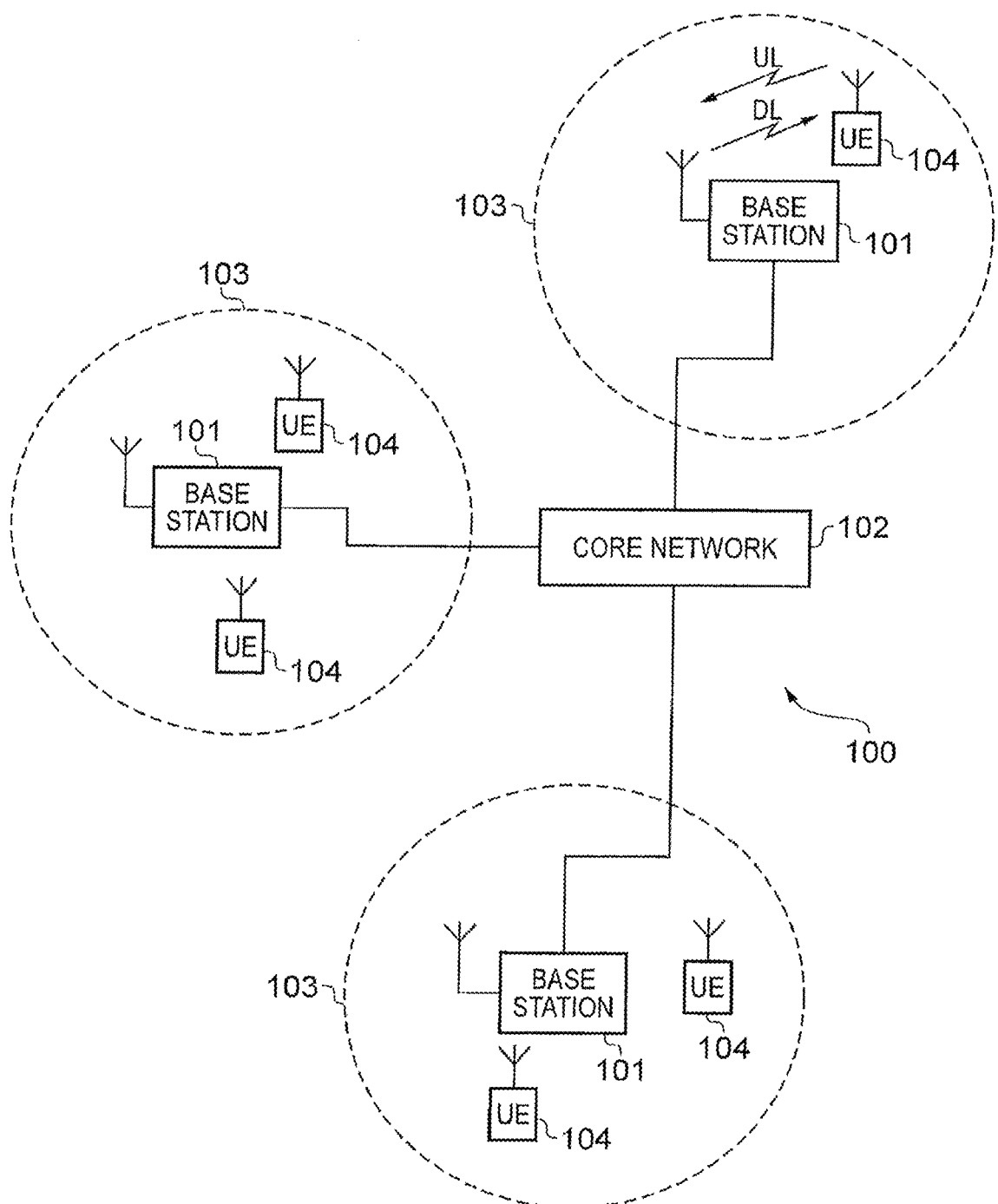
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below.

Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
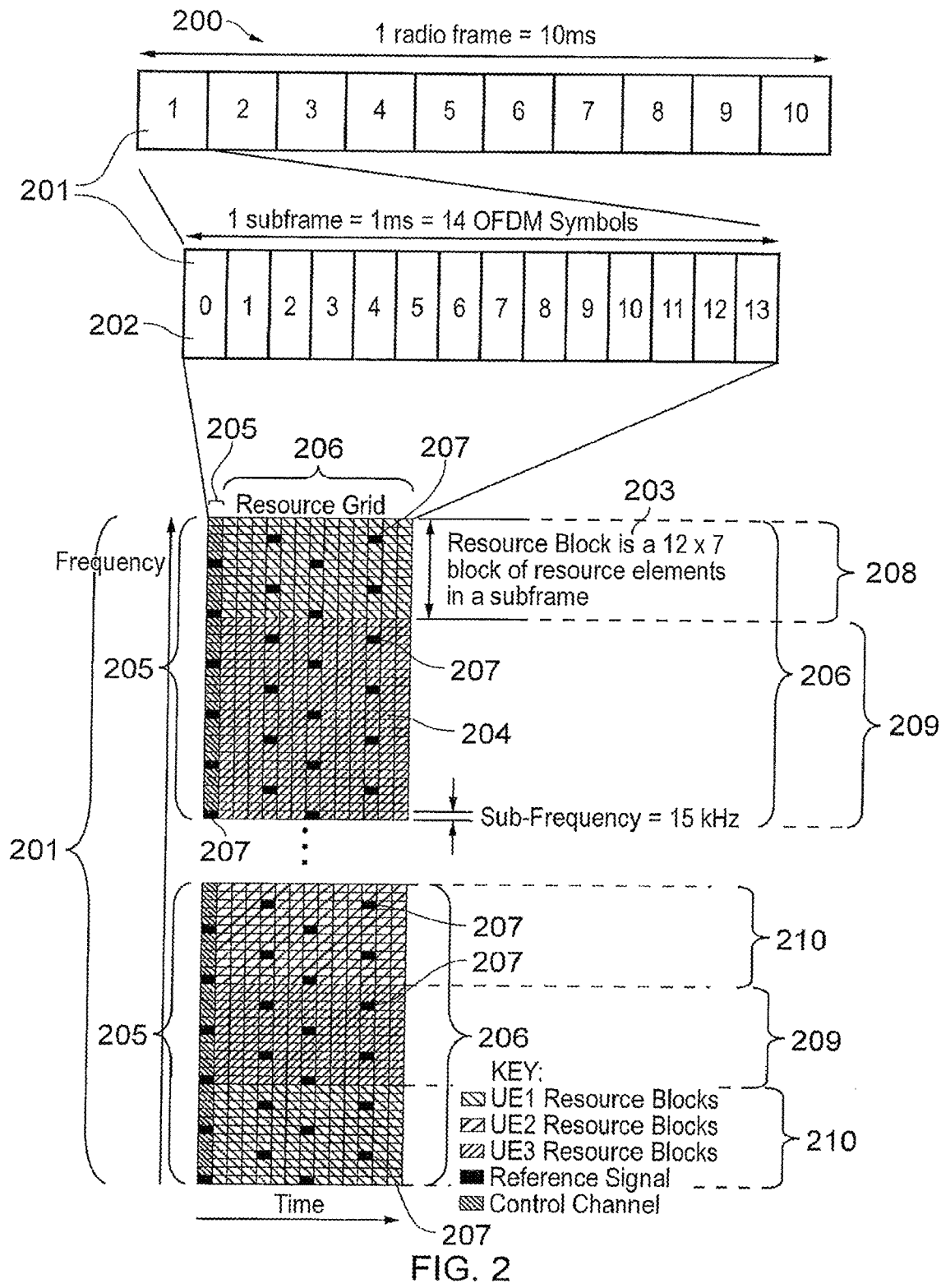
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is conventionally fixed at 15 KHz. However it has been proposed in the future [2][3] to provide also a reduced subcarrier spacing of 3.75 kHz for certain parts of the LTE wireless access interface for both the uplink and the downlink. As shown in FIG. 2, the resources of the wireless access interface are also temporally divided into frames where a frame 200 lasts 10 ms and is subdivided into 10 subframes 201 each with duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
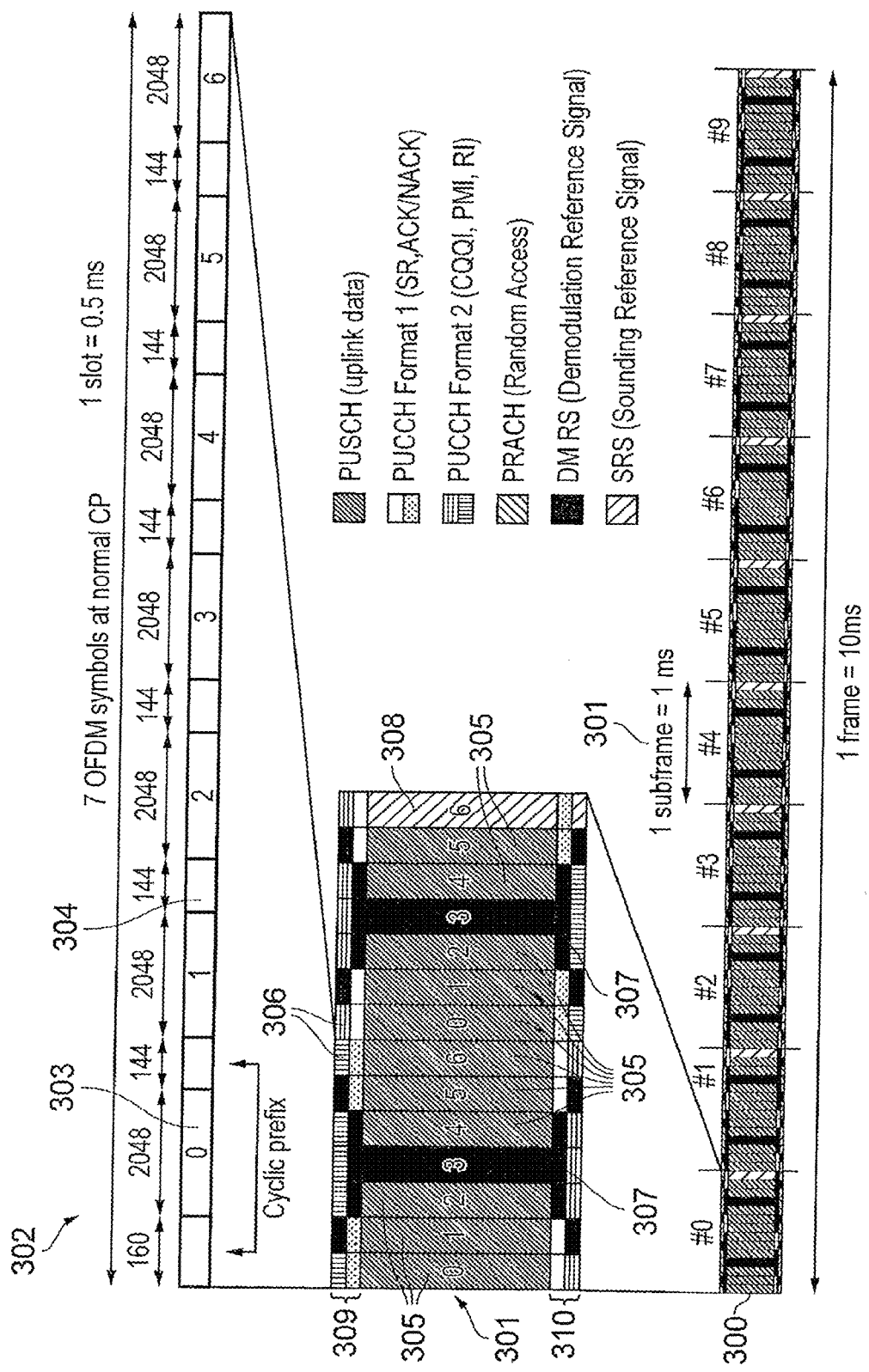
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Narrowband Internet of Things

Embodiments of the present technique can provide an arrangement in which a mobile communications device or UE 104 can operate to communicate in a wireless communications system via a base station or infrastructure equipment. A communications device is configured to transmit signals representing data to the infrastructure equipment on an uplink of a wireless access provided by the infrastructure equipment or to receive signals representing the data on a downlink of the wireless access interface from the infrastructure equipment. The wireless access interface can provide a plurality of different spacings of subcarriers for transmitting or receiving the signals representing the data. The communications device is configured to receive an indication on a downlink of the wireless access interface of one of the plurality of different subcarrier spacings which the communications device should use to transmit or to receive the signals representing the data, the indicated subcarrier spacing also determining whether the communications device should use a single subcarrier or multiple subcarriers. As such a subcarrier spacing can be selected for the communications device by the infrastructure equipment which can be restricted for single subcarrier operation, which although reducing a data communications bandwidth compared to a multiple subcarrier allocation can increase a range for wireless communications by increasing a power spectral density of the transmitted signal. As explained above, this arrangement can provide an improvement in uplink communications for remotely located and/or indoor devices, particularly those which have a reduced complexity and therefore lower performance transmitter or indeed limited transmission power.

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:
1. 'Stand-alone operation' utilizing for example the spectrum currently being used by GERAN systems as a replacement of one or more GSM carriers
2. 'Guard band operation' utilizing the unused resource blocks within a LTE carrier's guard-band
3. 'In-band operation' utilizing resource blocks within a normal LTE carrier In known LTE systems the smallest uplink resource granularity is one physical resource block (PRB), which comprises twelve subcarriers. However it has been proposed in [3], that a finer uplink resource granularity can be provided where the uplink signal can be transmitted in a single tone (single subcarrier) or multi-tones (multiple subcarriers). Single tone transmission allows the UE to concentrate (i.e. PSD boost) its power onto a single subcarrier, which can provide a greater transmission range for transmitted signals. This is beneficial for large coverage enhancement operations. However, single tone transmission can only carry a small amount of information since the (frequency) resource is limited. On the other hand, multi-tone transmission occupying several subcarriers (up to an entire PRB) has more resources but the power is spread among multiple subcarriers and therefore it has a shorter range compared to that of a single tone transmission. Using single tone transmission would increase the capacity of the system, because it allows more UEs to access the wireless access interface simultaneously. According to the present technique therefore a controller or scheduler in the eNB can provide resources of the wireless access interface with greater flexibility since the scheduler can allocate the resources with a finer granularity.

Signalling the Subcarrier Spacing

According to an example embodiment of the present technique, a UE can transmit uplink data using a sub-carrier as a single tone, which can be transmitted as one of two different subcarrier spacings depending on the decision of the infrastructure equipment. Note that the term "subcarrier spacing" is applicable for both multi-tone and single-tone transmission: for the case of single-tone transmissions, it relates to the spacing between subcarriers of transmissions from different UEs. According to one example the subcarrier spacing can be either 3.75 kHz or 15 kHz. Multi-subcarrier/multi-tone transmission is only supported when there is a 15 kHz subcarrier spacing. The 3.75 kHz single tone transmission has an advantage over the 15 kHz subcarrier spacing in that the power spectral density is boosted, leading to longer range transmission. In other examples the 15 kHz subcarrier spacing can mitigate its shorter transmission range by signal repetition, leading to an increased range, but with the disadvantage of supporting a lower data rate (due to the repetition of the signal). However with the availability of two possible subcarrier spacings and modes of transmission (single tone on a single subcarrier, or multiple tones via multiple subcarriers) there is a need to provide an arrangement for informing the UE of the subcarrier spacing it should use, the mode of transmission (single or multiple subcarriers) and indeed the location of the subcarrier(s).

According to one proposal, after the first random access message, which might include a preamble identifying the UE, the first uplink message from the UE would at least be transmitted using single tone. The eNB would therefore be configured to receive the first uplink message as a single tone transmission. Since there maybe two types of single tone transmission, with different subcarrier spacing, the UE needs to know which single tone transmission should be used. Furthermore it would also benefit the eNB if single tone or multi tone transmission can be indicated dynamically. According to the present technique therefore, the eNB can signal the subcarrier spacing, which should be used by the UE, in an uplink grant message. Typically, the uplink grant message includes scheduling information such as an indication of the frequency resource, time resource (if repetition is used) and the modulation and coding scheme (MCS), which should be used. According to the present technique, a new indicator is introduced which informs the UE of the subcarrier spacing, which should be used, for example whether to use 3.75 kHz or 15 kHz subcarrier spacing. For the example of LTE, the uplink grant message is carried by the Downlink Control Information (DCI), which is transmitted via a downlink control channel, which is a PDCCH (or a narrow band (NB)-PDCCH). In another example, the uplink grant message carrying this scheduling information can also be carried by the Random Access Response (RAR) during a random access process.

Figure 4:
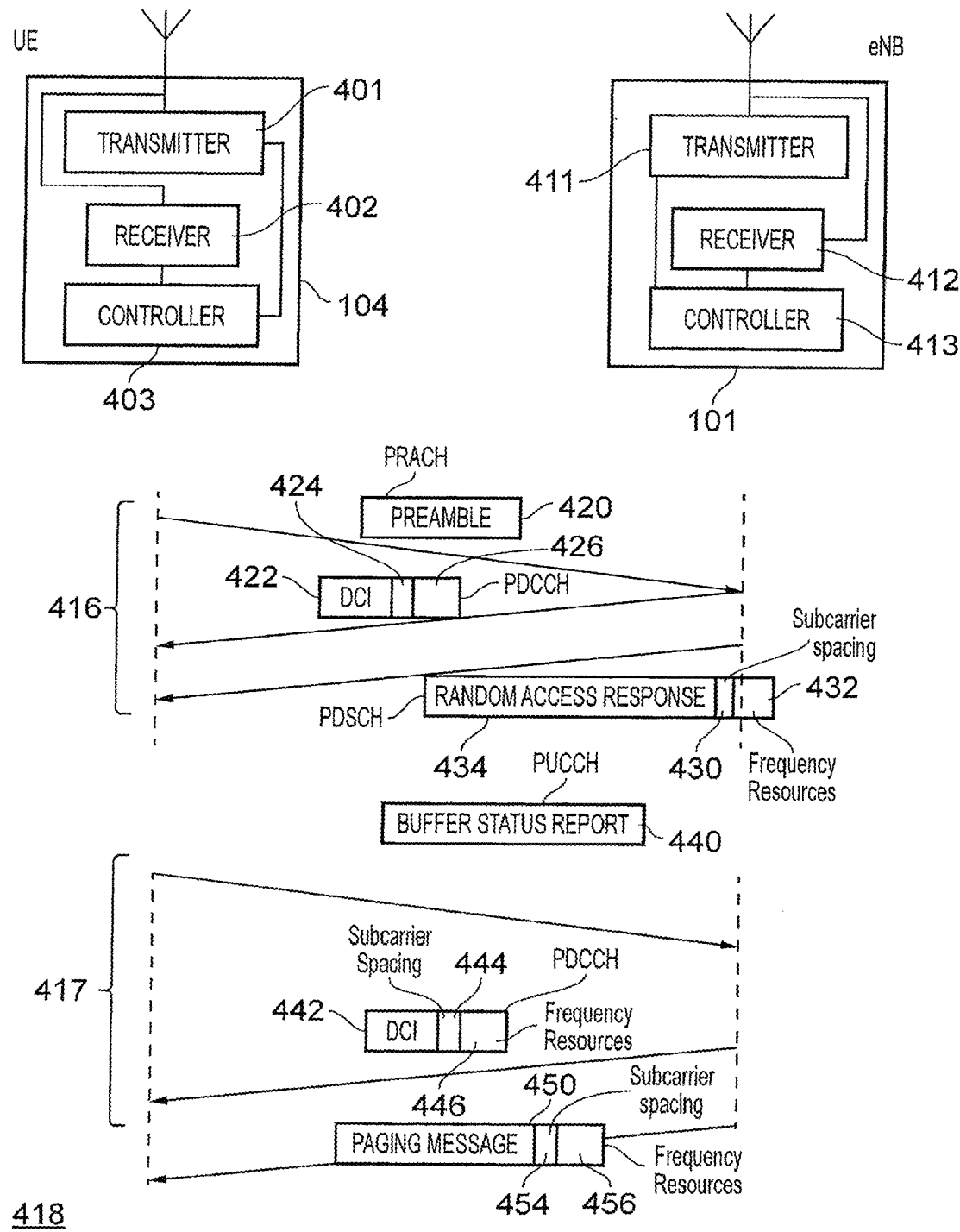
FIG. 4 is a part schematic block diagram of a communications device and an infrastructure equipment, part message flow diagram illustrating a process of granting uplink resources to the communications device and indicating a subcarrier spacing which should be used according to the present technique.

FIG. 4 provides an example block diagram of a communications device or UE 104 and a base station or eNB 101 performing a message exchange in accordance with an embodiment of the present technique, in which the eNB signals the subcarrier spacing which should be used by a UE 104 to transmit data on the uplink to the eNB. As shown in FIG. 4, a UE 104 includes a transmitter 401 and a receiver 402 which are controlled by a controller 403. Correspondingly, the eNB 101 includes a transmitter 411 and a receiver 412 which are controlled by a controller 413 which can be referred to as a scheduler. As explained above, the UE 104 transmits and receives signals to and from the eNB 101 via a wireless access interface provided by the eNB as part of the wireless communications network. In accordance with the present technique, the UE 104 is provided with an indication of a subcarrier spacing to use which also implies whether the allocated resources for transmitting data on the uplink to the eNB 101 is for a single subcarrier or for multiple subcarriers.

FIG. 4 also illustrates a message exchange between the UE 104 and the eNB 101 providing three examples 416, 417, 418 of events during which the eNB can signal to the UE the subcarrier spacing which should be used. The UE 104 also receives an indication from the eNB 101 of whether the uplink resource is for a single subcarrier or multiple subcarriers and also a frequency resource allocation identifying the subcarrier which should be used or the multiple subcarriers which should be used depending upon the subcarrier spacing selected by the eNB 101. In a first example 416 the random access response message transmitted on the PDSCH includes a field 430 which identifies the subcarrier spacing to be used and in a field 432 the frequency resources to be used. Depending on whether the subcarrier spacing indicates 3.75 kHz or 15 kHz, the UE 104 interprets the frequency resource field differently. in which the UE 104 is signalled to use a subcarrier spacing.

As shown in FIG. 4, the communications device 104 first transmits a preamble 420 via a PRACH channel in accordance with a conventional random access procedure. As part of the random access procedure the eNB 101 transmits a random access response message 434 via the PDSCH which is scheduled by transmitting a DCI message 422 on the PDCCH. There then follows a procedure (not shown) in which the UE 104 requests uplink resources by establishing an RRC connection. The random access response message 434 is transmitted in the PDSCH and the following messages associated with RRC connection setup are transmitted via PDSCH and PUSCH (e.g. an RRC connection setup request message is transmitted via PUSCH and an RRC connection setup message is transmitted via PDSCH). For this example 416, the uplink grant in the RAR messages can include a field indicating the subcarrier spacing 430 and a frequency resources field 432. Depending on the value of the field 430 indicating the subcarrier spacing, the UE 104 interprets the frequency resource field 432 differently as will be explained in the paragraphs below. Therefore, if the subcarrier spacing field 430 indicates that the allocated subcarrier spacing is only for a single carrier operation then the UE 104 interprets the frequency resource field 432 as an allocation of a single subcarrier identified by a number of that subcarrier spacing. In contrast if the sub carrier spacing 430 can be for single or multiple subcarriers, then the frequency resource field 432 provides an indication of a frequency band providing a plurality of subcarriers.

In the second example 417 the UE transmits a buffer status report 440 in the uplink on a PUSCH to the eNB 101. The UE may transmit several buffer status report messages, which may be transmitted periodically to inform the eNB of the amount of data which is present in a buffer of the UE 104 (not shown in FIG. 4 but see FIG. 10). In accordance with predetermined criteria set in the controller 413, the controller 413 decides to grant uplink resources to the UE 104 to transmit data from the UE's buffer on the uplink. Accordingly, the eNB 101 transmits a DCI message 442 which includes a field 444 identifying the subcarrier spacing to be used and the frequency resources which the UE should use on the uplink 446. The subcarrier spacing field 444 and the frequency resource field 446 provide the same information as the subcarrier field 430 and the frequency resources field 432 in the Random Access Response messages transmitted in the first example 416.

As a third example 418 the eNB 101 has data to transmit to the UE 104 on the downlink. In accordance with a conventional arrangement, if the UE 104 is currently in an idle mode then a paging message 450 is transmitted to the UE 104 in order to instruct the UE to switch to an active mode, and to receive an allocation of communications resources on the downlink for the UE 104 to receive the data. In this embodiment, the paging message contains information for subcarrier spacing 454. Essentially, the subcarrier spacing field 454 and the frequency resource field 454 provide the same information as the subcarrier spacing field 430, 444 and the frequency resource field 432, 446 for the first and second examples 417, 418.

The examples above show how a subcarrier spacing field 430,444 and frequency resource field 432, 446 can be used to define the subcarrier spacing and frequency resources applied in the uplink. It will be apparent to a skilled artisan how in a similar manner, a subcarrier spacing field uplink. It will be apparent to a skilled artisan how in a similar manner, a subcarrier spacing field 424 and a frequency resources field 426 could also be applied to define the subcarrier spacing and frequency resources used for a downlink transmission 434.

The specification in each of the respective subcarrier spacing field 424, 430, 444, 454 and frequency resource field 426, 432, 446, 456 will be explained in the following paragraphs with several examples.

The examples above show how a subcarrier spacing field 430,444 and frequency resource field According to an example embodiment, as illustrated above, the subcarrier spacing field can be a single bit in the DCI for indicating whether the uplink transmission uses a 3.75 kHz or 15 kHz subcarrier spacing.

According to a conventional arrangement control messages transmitted via the PDCCH or NB-PDCCH need to be blindly decoded by the UE. Typically to reduce the number of blind decodes, a common DCI format or DCI size is used. For a Narrow Band Internet of Things, a common DCI may be used to schedule a 3.75 kHz single tone transmission and 15 kHz single or multi-tone transmissions. Therefore, in another embodiment, when the indication provided in the DCI indicates that a 3.75 kHz subcarrier spacing should be used, a frequency resource field in the uplink grant is used to indicate one of 48 subcarriers. On the other hand, if the control message indicates a 15 kHz subcarrier spacing, the number of subcarriers available for allocation is twelve, which can be single tone or multiple tones allocations, and the frequency resource field can indicated an allocation of for example 1, 2, 4, 8 or 12 subcarriers. As such, in accordance with the subcarrier spacing which is selected, the interpretation of the frequency resource field 432, 446 is different as shown in FIG. 5.

Figure 5:
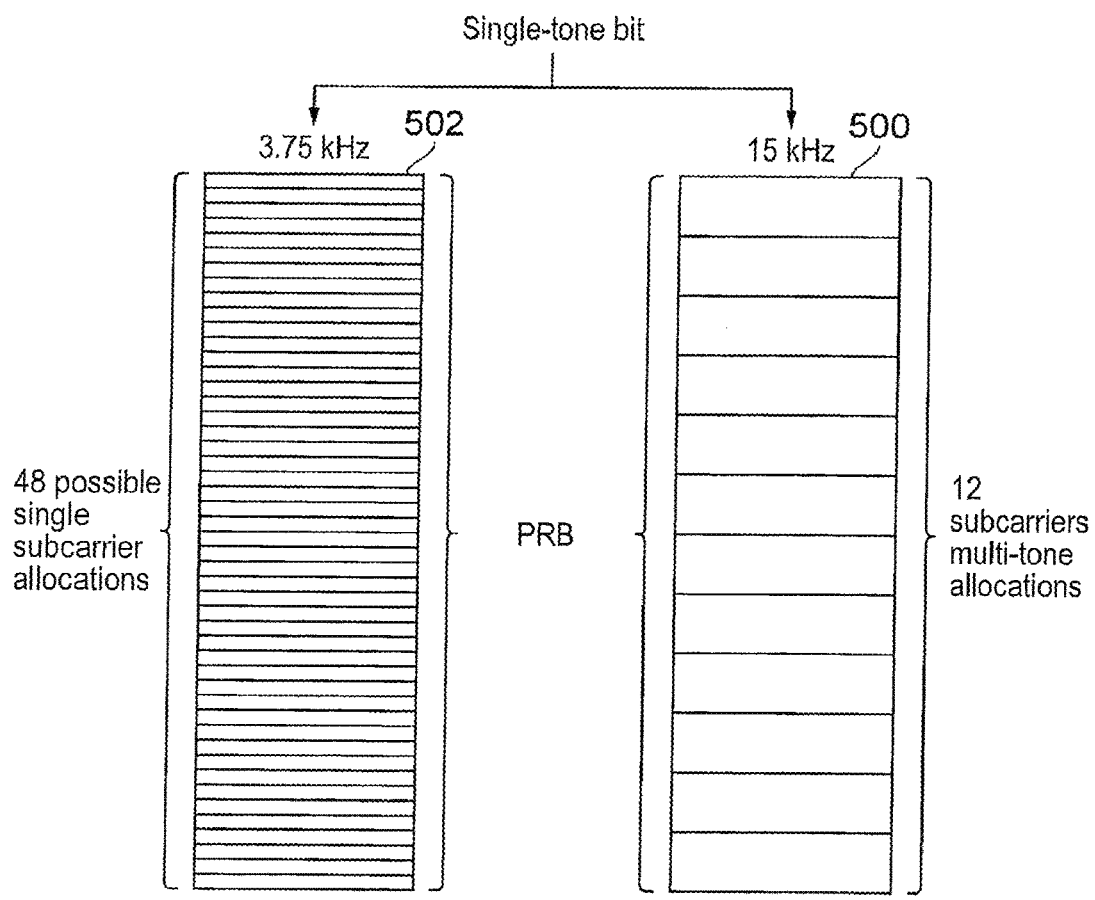
FIG. 5 is a schematic illustration showing how a single bit field can be used to indicate either a 3.75 kHz subcarrier spacing or a 15 kHz subcarrier spacing.

FIG. 5 provides a schematic illustration of an example of two predetermined subcarrier spacing of 3.75 kHz and 15 kHz. The lines 500 on the right hand side represent the subcarriers for 15 kHz spacing whereas lines 502 on the left hand side of the diagram represent subcarrier spacing for 3.75 kHz. In one example, a single bit represents the subcarrier spacing selected, for example, a value of "0" representing a 3.75 kHz spacing or a value of "1" representing a 15 kHz spacing.

Figure 6:
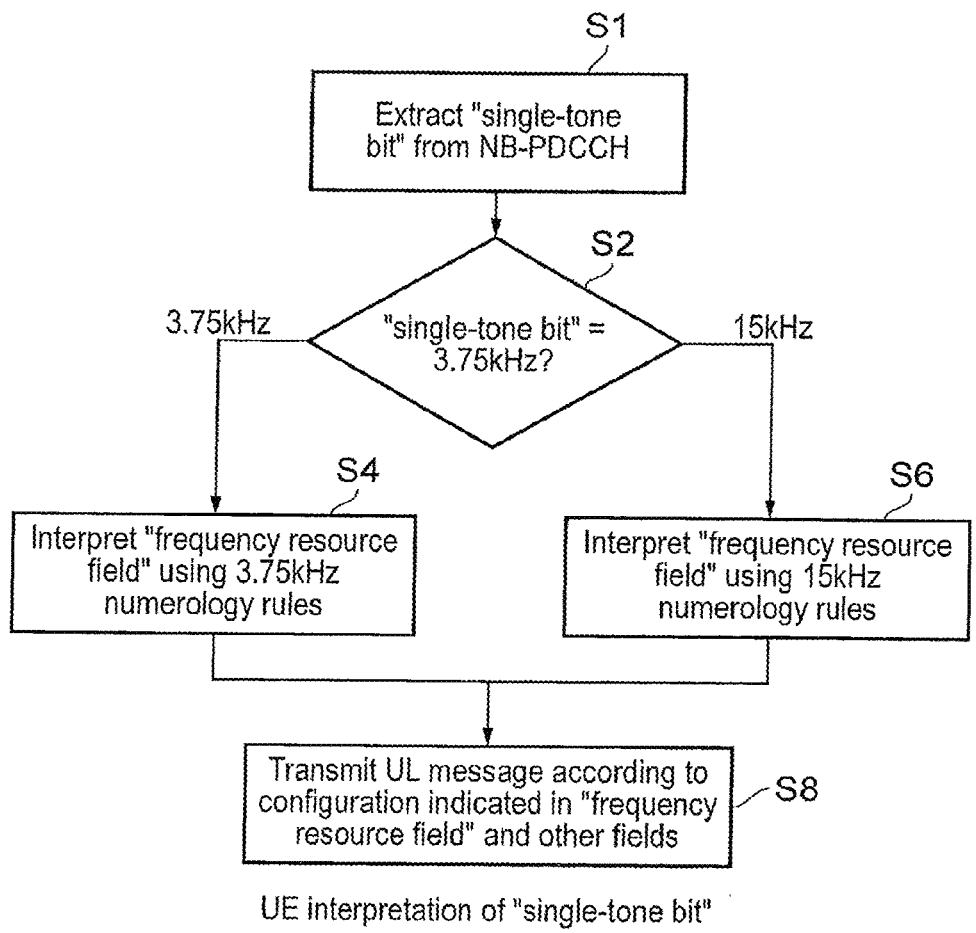
FIG. 6 is a flow diagram illustrating an example process in which a communications device detects a subcarrier spacing selected by an infrastructure equipment of a wireless communications network according to the present technique.

An example flow chart, illustrating a process in which the UE interprets a control message from an eNB, such as a "single-tone/subcarrier spacing bit" indicator in a DCI message is shown in FIG. 6. The process represented by the flow diagram shown in FIG. 6 is summarised as follows:

S1: The receiver 402 under the control of the controller 403 within the UE 104 first extracts the single bit representing the subcarrier spacing as either 3.75 kHz or 15 kHz from, for example, a narrow band PDCCH.

At decision point S2, the controller determines whether the subcarrier spacing bit or single tone bit is set to indicate a 3.75 kHz subcarrier spacing. If the bit is set to indicate a 3.75 kHz subcarrier spacing then processing proceeds to step S4. Otherwise, processing proceeds to step S6 for a 15 kHz subcarrier spacing.

S4: If the single bit indicating the subcarrier spacing of 3.75 kHz is set, then the next frequency resource field 432, 446 is interpreted as indicating a single subcarrier at a particular location within the frequency band using numerical rules for 3.75 kHz subcarrier spacing.

S6: If the bit representing the selected subcarrier spacing is set to indicate a 15 kHz subcarrier spacing then the frequency resource field 432, 446 is interpreted in accordance with numerical rules to represent a single or a multiple carrier allocation.

S8: The UE then proceeds to transmit signals via the allocated subcarrier or multiple subcarriers according to the configuration allocated by the frequency resource field. Furthermore, other scheduling information may indicate other communications parameters such as the modulation coding scheme or transport block size etc.

An example illustration of how the eNB 101 can communicate to the UE 104 in accordance with a predetermined arrangement identifying the meaning of the "frequency resource field" 432, 446 is shown in Table 1. In this example, the frequency resource field has a different interpretation depending on the "subcarrier spacing bit" (equivalent to the "single-tone bit" of step S1 in FIG. 6) indicating whether the sub-carrier spacing is 3.75 kHz or 15 kHz. Depending on the value of the sub-carrier spacing indicator:

If the subcarrier spacing is indicated as 3.75 kHz, then the "frequency resource field" directly indicates the single tone to be used for the uplink transmission.

If the subcarrier spacing is indicated as 15 kHz, then the "frequency resource field" indicates the starting subcarrier and the number of consecutive subcarriers to be used for the 15 kHz numerology transmission: either a single tone transmission or a multi-tone transmission. The starting subcarrier locations of the multi-tone transmissions are a multiple of the number of tones used for the 3.75 kHz single-tone transmission.

TABLE 1

Example meaning of the "frequency resource field"
according to an embodiment of the invention

| "frequency resource field" | Meaning of "subcarrier spacing bit" | |
|---|---|---|
| | "subcarrier spacing bit" = 3.75 kHz | "subcarrier spacing bit" = 15 kHz |
| 0: 000000 | Subcarrier 0 | Subcarrier 0; 1 tone |
| 1: 000001 | Subcarrier 1 | Subcarrier 1; 1 tone |
| 2: 000010 | Subcarrier 2 | Subcarrier 2; 1 tone |
| 3: 000011 | Subcarrier 3 | Subcarrier 3; 1 tone |
| 4: 000100 | Subcarrier 4 | Subcarrier 4; 1 tone |
| 5: 000101 | Subcarrier 5 | Subcarrier 5; 1 tone |
| ... | ... | ... |
| 11: 001011 | Subcarrier 11 | Subcarrier 11; 1 tone |
| 12: 001100 | Subcarrier 12 | Subcarrier 0; 2 tones |
| 13: 001101 | Subcarrier 13 | Subcarrier 2; 2 tones |
| 14: 001110 | Subcarrier 14 | Subcarrier 4; 2 tones |
| ... | ... | ... |
| 17: 010001 | Subcarrier 17 | Subcarrier 10; 2 tones |
| 18: 010010 | Subcarrier 18 | Subcarrier 0; 4 tones |
| 19: 010011 | Subcarrier 19 | Subcarrier 4; 4 tones |
| 20: 010100 | Subcarrier 20 | Subcarrier 8; 4 tones |
| 21: 010101 | Subcarrier 21 | Subcarrier 0; 8 tones |
| 22: 010110 | Subcarrier 22 | Subcarrier 4; 8 tones |
| 23: 010111 | Subcarrier 23 | Subcarrier 0; 12 tones |
| ... | ... | N/A |
| 47: 101111 | Subcarrier 47 | N/A |
| ... | N/A | N/A |
| 63: 111111 | N/A | N/A |

Another example of the table is shown in Table 2. The "reserved" fields in this table 2 can be used to signal for purposes other than frequency resource indication. For example the field could be used to signal a "PDCCH order", where the PDCCH order provides a procedure for the eNB to send a message to the UE directly using lower layer signalling, i.e. below MAC layer, or could be used to enhance the error detection capability of the PDCCH message. This is because, if the UE receives one of a plurality of reserved values, it ignores the contents of the PDCCH. In this example, the frequency resource field also has a different interpretation depending on the "subcarrier spacing bit" indication:

For 3.75 kHz, the "frequency resource field" directly indicates the single tone to be used for the uplink transmission. In this table, only a subset of the possible single tone transmissions are allowed. The example shows that every second single tone transmission at 3.75 kHz is allowed. This restriction in the number of single tone transmissions may limit the number of UEs that can be simultaneously assigned, but this is not a significant concern if the system is not uplink capacity limited. By allowing 3.75 kHz single tone transmissions to be signalled throughout the system bandwidth, scheduler flexibility is maintained.

For 15 kHz, the "frequency resource field" indicates the starting subcarrier and the number of consecutive subcarriers to be used for the 15 kHz numerology transmission either a single tone transmission or a multi-tone transmission. The starting subcarrier locations of the multi-tone transmissions are a multiple of the number of tones used for the 3.75 kHz single-tone transmission.

TABLE 2

Example meaning of the "frequency resource field"

| "frequency resource field" | Meaning of "subcarrier spacing bit" | |
|---|---|---|
| | "subcarrier spacing bit" = 3.75 kHz | "subcarrier spacing bit" = 15 kHz |
| 0: 000000 | Subcarrier 0 | Subcarrier 0; 1 tone |
| 1: 000001 | Subcarrier 2 | Subcarrier 1; 1 tone |
| 2: 000010 | Subcarrier 4 | Subcarrier 2; 1 tone |
| 3: 000011 | Subcarrier 8 | Subcarrier 3; 1 tone |
| 4: 000100 | Subcarrier 10 | Subcarrier 4; 1 tone |
| 5: 000101 | Subcarrier 12 | Subcarrier 5; 1 tone |
| ... | ... | ... |
| 11: 001011 | Subcarrier 22 | Subcarrier 11; 1 tone |
| 12: 001100 | Subcarrier 24 | Subcarrier 0; 2 tones |
| 13: 001101 | Subcarrier 26 | Subcarrier 2; 2 tones |
| 14: 001110 | Subcarrier 28 | Subcarrier 4; 2 tones |
| ... | ... | ... |
| 17: 010001 | Subcarrier 34 | Subcarrier 10; 2 tones |
| 18: 010010 | Subcarrier 36 | Subcarrier 0; 4 tones |
| 19: 010011 | Subcarrier 38 | Subcarrier 4; 4 tones |
| 20: 010100 | Subcarrier 40 | Subcarrier 8; 4 tones |
| 21: 010101 | Subcarrier 42 | Subcarrier 0; 8 tones |
| 22: 010110 | Subcarrier 44 | Subcarrier 4; 8 tones |
| 23: 010111 | Subcarrier 46 | Subcarrier 0; 12 tones |
| 24 -> 31 | reserved | reserved |

In another embodiment of the invention, there is no explicit "subcarrier spacing bit" indication in the PDCCH, but the "uplink transmission configuration" i.e. use of a single-tone and the configuration of a single tone or multi-tone is determined directly from the table. An example of this signalling is shown in Table 3. In this table, there is a restricted number of possible configurations for the 3.75 kHz single tone transmission. In this case, the 3.75kHz single tone transmissions occupy a group of consecutive subcarriers in the lower portion of the frequency resource space. A restricted number of 3.75 kHz single tone transmissions may be adequate when it is considered that only a proportion e.g. 5% of the devices in the cell experience extreme coverage conditions so that only that limited number need the 3.75 kHz single tone transmission and the other devices can be serviced with 15 kHz single or multi-tone transmissions.

TABLE 3

Example meaning of the "frequency resource field"
according to an embodiment of the invention

| "uplink transmission configuration" | Physical configuration of uplink resources |
|---|---|
| 0: 000000 | 15 kHz; Subcarrier 0; 1 tone |
| 1: 000001 | 15 kHz; Subcarrier 1; 1 tone |
| 2: 000010 | 15 kHz; Subcarrier 2; 1 tone |
| 3: 000011 | 15 kHz; Subcarrier 3; 1 tone |
| 4: 000100 | 15 kHz; Subcarrier 4; 1 tone |
| 5: 000101 | 15 kHz; Subcarrier 5; 1 tone |
| ... | ... |
| 11: 001011 | 15 kHz; Subcarrier 11; 1 tone |
| 12: 001100 | 15 kHz; Subcarrier 0; 2 tones |
| 13: 001101 | 15 kHz; Subcarrier 2; 2 tones |
| 14: 001110 | 15 kHz; Subcarrier 4; 2 tones |
| ... | ... |
| 17: 010001 | 15 kHz; Subcarrier 10; 2 tones |
| 18: 010010 | 15 kHz; Subcarrier 0; 4 tones |
| 19: 010011 | 15 kHz; Subcarrier 4; 4 tones |
| 20: 010100 | 15 kHz; Subcarrier 8; 4 tones |
| 21: 010101 | 15 kHz; Subcarrier 0; 8 tones |
| 22: 010110 | 15 kHz; Subcarrier 4; 8 tones |
| 23: 010111 | 15 kHz; Subcarrier 0; 12 tones |
| 24: 011000 | 3.75 kHz; Subcarrier 0 |

TABLE 3-continued

Example meaning of the "frequency resource field"
according to an embodiment of the invention

| "uplink transmission configuration" | Physical configuration of uplink resources |
|---|---|
| 25: 011001 | 3.75 kHz; Subcarrier 1 |
| 26: 011010 | 3.75 kHz; Subcarrier 2 |
| ... | ... |
| 31: 111111 | 3.75 kHz; Subcarrier 7 |

According to another example, all possible configurations of 15kHz single-tone and multi-tone transmissions may be signalled compactly by noting that there is a limit to the starting tone location when the system bandwidth 180 kHz supports twelve 15 kHz subcarriers and the number of multi-tones is restricted to {1,2,4,8,12} consecutive multi-tones. For $n_{mt}$ consecutive multi-tones, and a twelve subcarrier system bandwidth, the starting 15 kHz subcarrier is limited to the range:

$$start\_subcarrier=0 \rightarrow 12-n_{mt}$$

Based on this observation, the possible configurations for the 15 kHz single-tone and multi-tone are as shown in Table 4 below. As will be appreciated, the method of signalling 15 kHz single-tone transmissions from this table can be combined with the other methods of signalling identified in the tables presented above.

TABLE 4

Possible configurations for 15 kHz single-tone and multi-tone transmissions

| Configuration index | uplink resource configuration | |
|---|---|---|
| | Start subcarrier | Number of subcarriers |
| 0 | 0 | 1 |
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 10 | 10 | 1 |
| 11 | 11 | 1 |
| 12 | 0 | 2 |
| 13 | 1 | 2 |
| 14 | 2 | 2 |
| 15 | 3 | 2 |
| 16 | 4 | 2 |
| 17 | 5 | 2 |
| 18 | 6 | 2 |
| 19 | 7 | 2 |
| 20 | 8 | 2 |
| 21 | 9 | 2 |
| 22 | 10 | 2 |
| 23 | 0 | 4 |
| 24 | 1 | 4 |
| 25 | 2 | 4 |
| 26 | 3 | 4 |
| 27 | 4 | 4 |
| 28 | 5 | 4 |
| 29 | 6 | 4 |
| 30 | 7 | 4 |
| 31 | 8 | 4 |
| 32 | 0 | 8 |
| 33 | 1 | 8 |
| 34 | 2 | 8 |
| 35 | 3 | 8 |

TABLE 4-continued

Possible configurations for 15 kHz single-tone and multi-tone transmissions

| Configuration index | uplink resource configuration | |
|---|---|---|
| | Start subcarrier | Number of subcarriers |
| 36 | 4 | 8 |
| 37 | 0 | 12 |

In another embodiment, a field in a control channel message indicates whether the UE is allocated a 3.75 kHz subcarrier-based uplink transmission or a 15 kHz subcarrier-based uplink transmission and a "frequency and repetition resource field" indicates the subcarrier location and number of repetitions that are applied to the transmission. This method of allocation allows the system to signal 15 kHz and 3.75 kHz transmissions with equal coverage, noting that repetition of the 15 kHz subcarrier signal can extend its coverage until it is comparable to that of the 3.75 kHz transmission. Other fields in the PDCCH will further configure the uplink transmission from the UE. For example, the "frequency and repetition" resource field can indicate a subcarrier and first repetition factor, REP1, and one or more of the other fields of the PDCCH can indicate another repetition factor, REP2. In this case, the overall repetition to be applied by the UE is:

$$REP_{overall}=REP_1 \times REP_2$$

According to this example embodiment an arrangement is provided which recognises that, at the same degree of coverage, more repetition is required with a single 15 kHz subcarrier than with a single 3.75kHz subcarrier due to the lower power spectral density of the 15 kHz subcarrier signal.

Table 5 below shows an example mapping between the contents of an index and the "frequency and repetition resource field", for the cases where the "subcarrier spacing" indication indicates 3.75 kHz and for the case where this indication indicates 15 kHz.

TABLE 5

Example meaning of the "frequency and repetition resource field"
according to an embodiment of the present technique

| "frequency and repetition resource field" | Meaning of "subcarrier spacing bit" | |
|---|---|---|
| | "subcarrier spacing bit" = 3.75 kHz | "subcarrier spacing bit" = 15 kHz |
| 0 | Subcarrier 0 | Subcarrier 0; REP1 = 1 |
| 1 | Subcarrier 1 | Subcarrier 0; REP1 = 2 |
| 2 | Subcarrier 2 | Subcarrier 0; REP1 = 3 |
| 3 | Subcarrier 3 | Subcarrier 0; REP1 = 4 |
| 4 | Subcarrier 4 | Subcarrier 1; REP1 = 1 |
| 5 | Subcarrier 5 | Subcarrier 1; REP1 = 2 |
| 6 | Subcarrier 6 | Subcarrier 1; REP1 = 3 |
| 7 | Subcarrier 7 | Subcarrier 1; REP1 = 4 |
| 8 | Subcarrier 8 | Subcarrier 2; REP1 = 1 |
| 9 | Subcarrier 9 | Subcarrier 2; REP1 = 2 |
| ... | | |
| 40 | Subcarrier 40 | Subcarrier 10; REP1 = 1 |
| 41 | Subcarrier 41 | Subcarrier 10; REP1 = 2 |
| 42 | Subcarrier 42 | Subcarrier 10; REP1 = 3 |
| 43 | Subcarrier 43 | Subcarrier 10; REP1 = 4 |
| 44 | Subcarrier 44 | Subcarrier 11; REP1 = 1 |
| 45 | Subcarrier 45 | Subcarrier 11; REP1 = 2 |
| 46 | Subcarrier 46 | Subcarrier 11; REP1 = 3 |
| 47 | Subcarrier 47 | Subcarrier 11; REP1 = 4 |

In other examples, the meaning and usage of the "subcarrier spacing" bit can be configurable by the eNB, for example via system information broadcasting SIB signalling. For example, the eNB could signal that the "subcarrier spacing" bit should be interpreted according to a table of the form of Table 1 or according to a table of the form of Table 5.

In another embodiment, similar to the frequency resources field, the modulating coding scheme MCS or transport block size TBS would also be interpreted differently whether a 3.75 kHz or 15 kHz subcarrier spacing is used. If 3.75 kHz is indicated by the subcarrier spacing indicator bit then the modulation coding scheme MCS or TBS index would refer to a different set of values e.g. a different lookup table in the specifications to that when 15 kHz is indicated. This embodiment is based on the observation that fewer transport bits can be transported per subcarrier using a 3.75 kHz numerology than for a 15 kHz numerology.

In another embodiment, no explicit bit is used but instead the subcarrier spacing used is implicitly indicated by the MCS/TBS field. The MCS/TBS field typically points to an index of a MCS/TBS table and this table would include entries that are only specific to single tone 3.75 kHz transmission and entries that are only specific to single and multi-tone 15 kHz transmissions. For example, the lowest X entries in the MCS/TBS table are only applicable for 3.75 kHz transmission and so if one of these entries is indicated, then it would implicitly indicate 3.75 kHz single tone transmission is used and the frequency resource would be interpreted for 48 subcarriers as per previous embodiment. If an entry other than one of the lowest X entries is used then this signalling would implicitly indicate 15 kHz subcarrier spacing which can be single tone or multi-tone.

Another method of determining whether the uplink transmission is based on a 3.75 kHz subcarrier or a 15 kHz subcarrier is based on UE measurements of downlink channel quality. The UE measures the downlink channel quality, for example by performing a reference signal received power RSRP measurement. Depending on the downlink channel quality, the UE chooses which set of PRACH resources to use, where different PRACH resources are associated with different coverage levels. Each set of PRACH resources is associated with either single-tone or multi-tone transmission for the first uplink message msg3 and with either a 3.75 kHz subcarrier bandwidth or a 15 kHz subcarrier bandwidth. In this method, there would be no need to indicate a "single tone" bit in the NB-PDCCH that allocates resource for the uplink transmission. The UE would reconfigure its NB-PDCCH decoding logic to interpret the NB-PDCCH according to whether the NB-PDCCH will allocate a 3.75 kHz uplink transmission or a 15 kHz uplink transmission, for example the UE interprets the "frequency resource field" of the NB-PDCCH depending on the set of PRACH resources that is used. Indeed, in this case, the format of the NB-PDCCH, for example the number of bits carried by the NB-PDCCH can be different depending on whether a 3.75 kHz uplink transmission is allocated or a 15 kHz transmission is allocated. This is because, in this case, the UE knows a-priori what format of DCI (carried by the NB-PDCCH) to decode: it does not need to blindly decode between different potential DCI formats.

Accordingly embodiments of the present technique can provide an arrangement for signalling efficiently different possible subcarrier spacings for which single or multiple tones are available, for example a 3.75 kHz subcarrier spacing is only used for single tone transmission and a 15 kHz subcarrier spacing is used for single tone and multi-tone transmissions. Although this signalling can be achieved by using higher layer protocols, such an implementation would reduce eNB scheduling flexibility.

Signalling a Dynamic TTI

In conventional LTE systems data is transmitted on both the uplink and the downlink, by dividing the data into blocks, known as transport blocks (TB) and transmitted within a Transmission Time Interval (TTI). The TTI in LTE is fixed to 1 ms or one subframe. Thus the size of the transport block is determined by the amount of data, which can be transmitted in a subframe. If a large Transport Block Size (TBS) needs to be transmitted, more frequency resources, in the form of Physical Resource Blocks (PRB)s can be used, since the time resource is fixed (to 1 ms).

Figure 7:
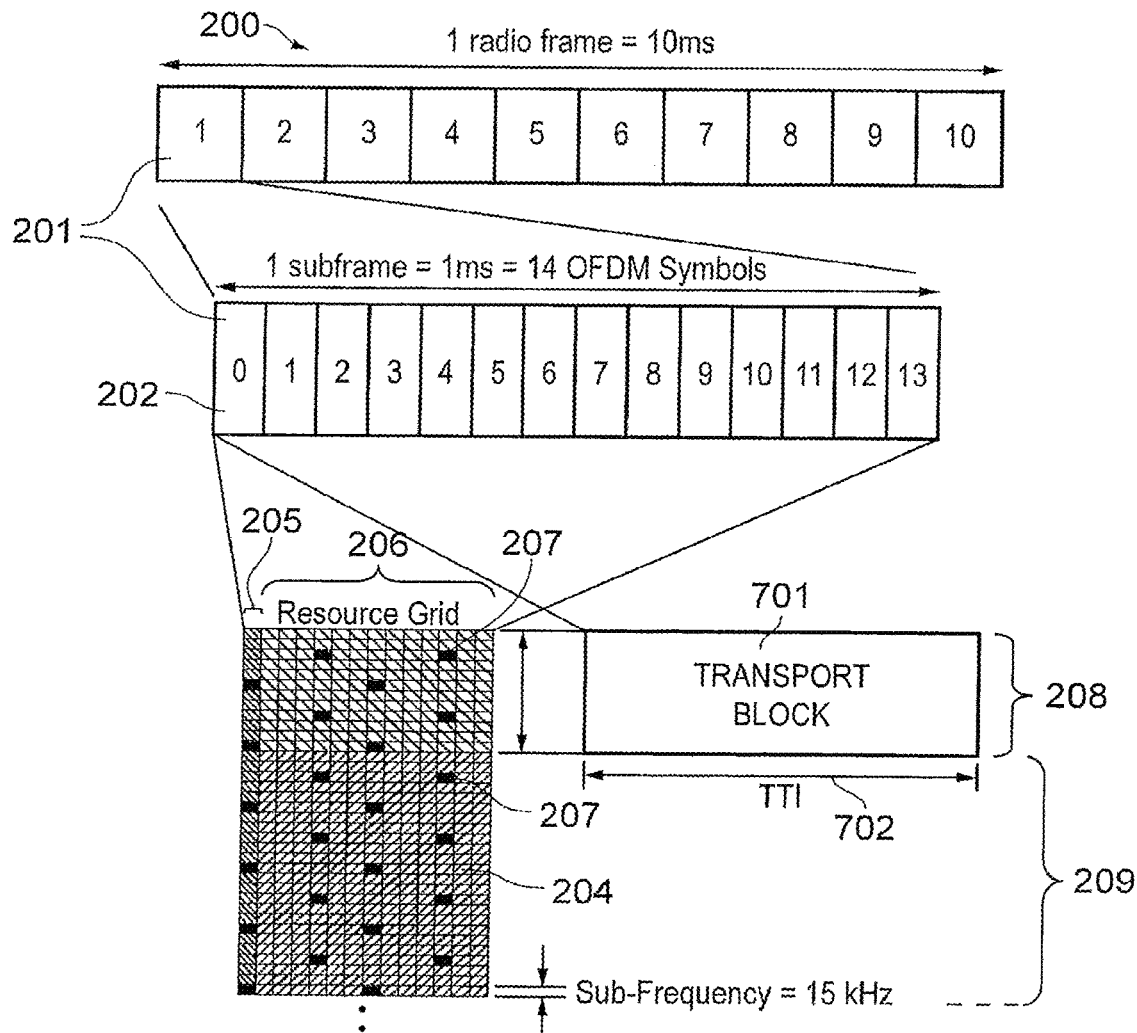
FIG. 7 is a schematic block diagram presenting the downlink frame structure shown in FIG. 2 but also showing a transmission of a transport block within one physical resource block of an LTE wireless access interface.

FIG. 7 provides an illustration of a conventional arrangement in which a transport block is transmitted by downlink to a UE. FIG. 7 corresponds to the diagram shown in FIG. 2 and so like features have the same references and only the differences to FIG. 2 will be described. As shown in FIG. 7 within a twelve subcarrier physical resource block (PRB) 208, an allocation is made for transmitting a transport block. As shown in FIG. 7 the physical resource block 701 has a size corresponding to the twelve subcarriers of the subframe and transports a transport block that is transmitted in one subframe. Accordingly, the transmission time interval, TTI, 702 is one millisecond corresponding to the subframe duration.

According to an example embodiment, which may find application to NB-IoT, a frequency resource available to a narrowband carrier is limited to one PRB. Furthermore frequency resource allocation to UEs can be made as one or more of the twelve available subcarriers of the PRB. As such, where the frequency resource allocation is less than the full PRB, then the Transport Block Size (TBS) must be adapted in accordance with the number of subcarriers of the available twelve allocated to the UE. Therefore for transmissions which use less than one PRB, the number of resource elements (REs) may not be sufficient to carry the desired TBS. It is possible to segment a data packet into multiple smaller transport blocks to be carried in multiple subframe transmissions, however, each transmission incurs overheads and therefore segmentation leads to lower efficiency due to overhead signalling associated with the transmission of each transport block. Hence in 3GPP, it is suggested that a transport block of the conventional size can be transmitted over multiple subframes, which is illustrated in FIGS. 8 and 9.

Figure 8:
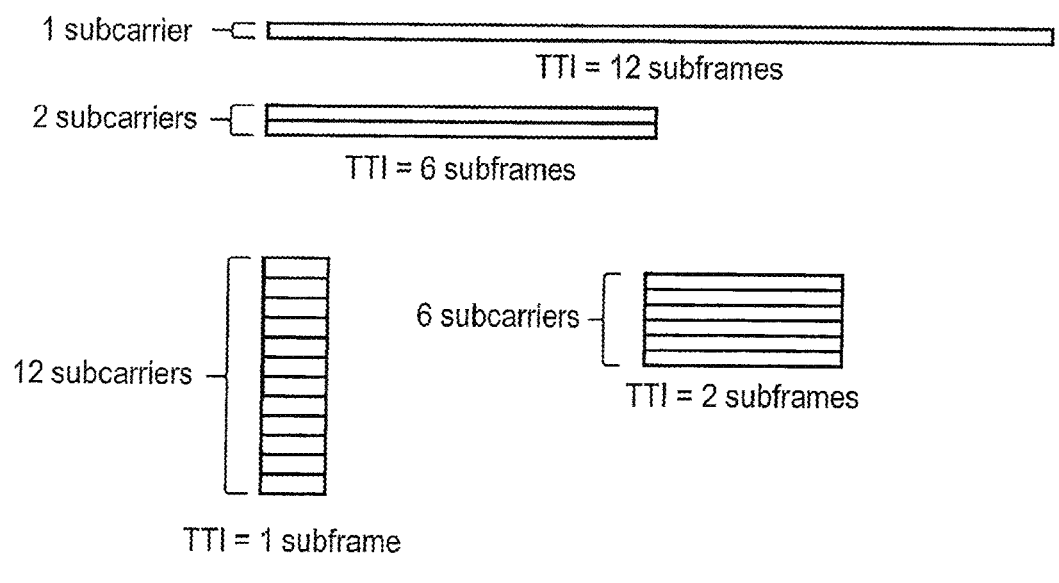
FIG. 8 is a schematic representation of different transmission time interval (TTI) lengths which change in accordance with the number of subcarriers for four different examples of subcarriers allocated to a communications device by an infrastructure equipment.
Figure 9:
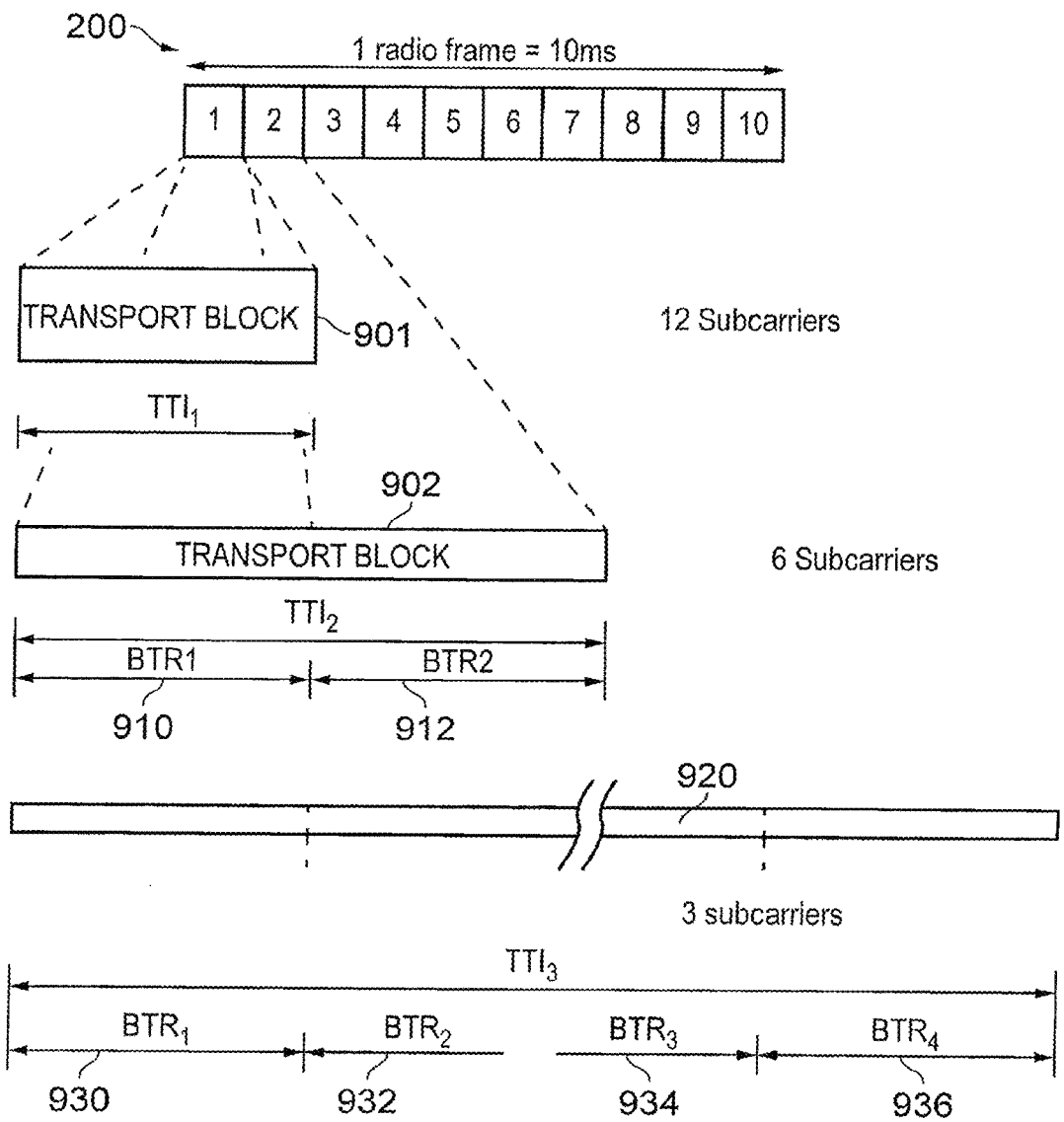
FIG. 9 is a schematic block diagram illustrating three different lengths of transmission time interval (TTI) resulting from three different examples of subcarrier allocations.

As shown in FIGS. 8 and 9, a conventional transport block, which would be transmitted in one LTE subframe is transmitted over n subframes, where n is a function of the number of subcarriers of the PRB allocated for the UE to transmit its data. As such the amount of data transmitted per subframe can be interpreted as a Basic Resource Unit (BRU), so that a Transport Block can be spread over multiple BRUs. The BRU consists of Basic Frequency Resource (BFR) and Basic Time Resource (BTR). As shown in FIG. 9, the BTU for transmitting data remains the same and the TTI for example can be a multiple of the BTR.

FIG. 8 provides a schematic block diagram illustrating an effect on the TTI of varying the number of subcarriers which are allocated to a UE to transmit or receive data. As shown in FIG. 8 four examples are provided illustrating how the length of the TTI changes between one, three, six and twelve carriers.

FIG. 9 provides a schematic diagram illustrating how the different numbers of subcarriers varies the TTI. As shown in FIG. 9 a radio frame 200 is shown which corresponds to the radio frame 200 shown in FIGS. 7 and 2. According to the conventional example shown in FIG. 7 for an LTE wireless access interface, allocating twelve subcarriers or a physical resource block allows the data of a conventional transport block size to be transmitted within one subframe as shown in FIG. 7 and FIG. 8. The transport block 901 is shown in FIG. 9 to have a duration of TTI1 for twelve allocated subcarriers. However, if the number of subcarriers allocated to the UE to receive data on the downlink is six subcarriers, then proportionally the length of the TTI must increase to twice the length for the example where twelve subcarriers are allocated assuming that the modulation and coding is the same. Therefore, as shown in FIG. 9 the transport block 902 is transmitted over two BTRs 910, 912 using a longer TTI2 that has increased Correspondingly, if the number of subcarriers allocated to the UE is three as shown in the third example, then the transport block 920 would be transmitted over an even longer TTI length such as TTI3, which is the equivalent of four BTRs 930, 932, 934, 936.

As will be appreciated from the above examples, the Basic Frequency Resource (BFR) is a single subcarrier. Hence, a Transport Block can be transmitted over multiple subcarriers.

There are two ways of interpreting the BTR which are:

The Basic Time Resource (in units of the number of subframes) is dependent upon the number of subcarriers used. For example BTR=12/(number of subcarriers), hence if 1 subcarrier is used, BTR=12 subframes and if 12 subcarriers (i.e. entire PRB) are used, BTR=1 subframe)

The BTR is fixed to a specific value regardless of the number of subframe used

Since a Transport Block can be transmitted using multiple BRU and the BRU can extend in time and frequency, this suggested that the TTI is variable. Therefore, there is a need to indicate the TTI used, or the BTR used for a specific transport block transmission.

According to the present technique there is provided an arrangement in which the TTI or BTR is implicitly or explicitly indicated in the DCI (grant). The signalling of the TTI or BTR as well as the frequency resource used is signalled using for example the DCI for both uplink resources granted and the downlink resources granted. The term TTI and number of BTR used refer to the same principle, that is, the number of subframes (or time resource) on which a transport block is transmitted. In the following paragraphs the term TTI is used because it is an existing term used in LTE. As will be appreciated though from the above discussion, according to the example embodiments, the TTI is dynamically variable as a function of the frequency resource allocated to the UE for transmitting or receiving.

Figure 10:
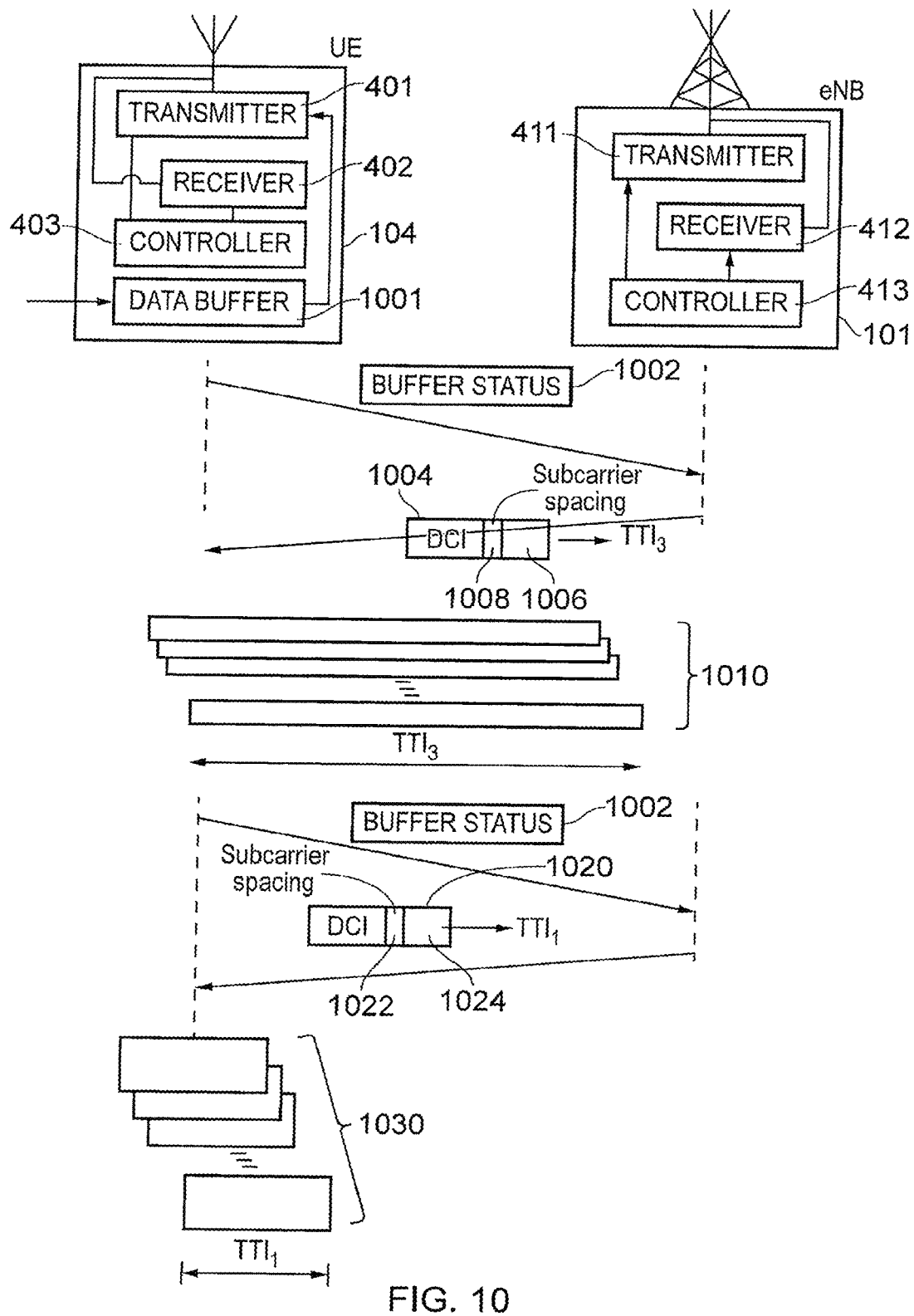
FIG. 10 is a schematic block diagram illustrating an arrangement between an infrastructure equipment and a communications device according to the present technique in which a downlink control message allocates resources on the downlink and provides an indication implicitly or explicitly of a transmission time interval length to use.

A part-schematic block diagram part-message flow diagram is shown in FIG. 10 illustrates example embodiments of the present technique. As shown in FIG. 10 the UE 104 and eNB 101 are shown which correspond to the UE and eNB illustrated in FIG. 4. However, in FIG. 10 the UE 104 includes a data buffer 1001. In accordance with a conventional arrangement and as illustrated in the second example 417 shown in FIG. 4, a UE 104 may conventionally transmit a buffer status report 1002 to the eNB. Accordingly, at some point, the eNB 101 transmits a DCI message 1004 allocating resources of the UE on the uplink to transmit the data within its data buffer 1001. However, in accordance with the present technique the DCI message 1004 includes a field 1006 providing information for the transmission of the data. In accordance with the present technique, the information in the field 1006 provides the UE 104 with an indication of the TTI size it should use. The indication may be a new field or may be provided from information relating to the transmission parameters which the UE should use, from which the TTI can be inferred. The DCI may also include a field indicating the subcarrier spacing 1008 which may be used as explained for the embodiments described above to identify a subcarrier spacing which the UE should use.

As will be appreciated from the above embodiments the TTI can be indicated in the downlink grant to cover both uplink and downlink transmissions. In the downlink grant, there is no need to indicate subcarrier spacing. FIG. 10 is valid for the uplink grant.

As shown in FIG. 10 the data in the data buffer 1001 is carried by a transport block which has a size and is arranged for transmission for example on three subcarriers which therefore requires that the TTI3 should be used.

In a second example a DCI message 1020 which correspondingly includes a field 1022 identifying the subcarrier spacing and provides in a field 1024 communications parameters for transmitting the data. As for the example explained above, the field providing the communications parameters 1024 can implicitly or explicitly identify the TTI which should be used by the UE. In the second example 1030 the TTI is of length TTI1 because twelve of the subcarriers of the available physical resource block have been allocated for transmitting the data on the uplink to the eNB. Accordingly, as shown in the second example of FIG. 10 the transport block is mapped to one subframe when the number of subcarriers allocated is equal to the maximum number which is available to be a shorter duration of TTI1.

As indicated above, in some embodiments, a new field is introduced in the DCI which indicates the length of the TTI. The possible TTI length can be predefined from either the absolute TTI length in terms of the number of subframes, or an index to a lookup table containing the allowed TTI length can be signalled in this new field.

In other embodiments, the TTI length is implicitly determined from the modulation and coding scheme (MCS). For a given number of subcarriers and a transport block size, an MCS with low coding rate would require more resources and in this case, more time resource and hence a longer TTI. Similarly an MCS with high coding rate would require less resource and therefore a shorter TTI. In terms of BTR, more BTR will be used for low code rate and vice versa for high code rate. The relationship between the actual TTI length and MCS can be prespecified and so known to both the UE and the eNB in the form of a lookup table, a formula or configured by higher layers.

In other embodiments, the TTI length is implicitly determined from the Transport Block Size (TBS). A larger TBS would require more resources and therefore for a given number of subcarriers, it would have a longer TTI. Similarly, a smaller TBS would require less resources and for a given number of subcarriers would have a shorter TTI. The relationship between TTI length and TBS can be prespecified and therefore known to the UE and the eNB in advance, and may be represented in the form of lookup table or formula or configured by higher layers.

In another embodiment, the TTI length is implicitly determined by the number of subcarriers used. The smaller the number of subcarriers used, the longer the TTI to make up for the lack of resources in the frequency domain. Similarly, the larger the number of subcarriers used, the shorter the TTI since more resources are available in the frequency domain.

In other embodiments the number of "equivalent PRB" $P_{E\_PRB}$, is indicated in the DCI. It will be appreciated that in the current LTE system the number of PRB used is signalled and together with the MCS Index, the TBS can be determined from a lookup table such as that disclosed in TS36.213 [4]. However, in NB-IoT only a single PRB is used and therefore the "equivalent PRB" is a new indication of the amount of resources required in terms of a fraction of the PRB. Since the number of subcarriers in a PRB is known (i.e. 12×15 kHz subcarriers or 48×3.75 kHz subcarriers), then the TTI in terms of the number of subframes can be directly calculated from $P_{E\_PRB}$ used. Therefore for a 15 kHz subcarrier bandwidth:

$$TTI = \frac{12 \times P_{E\_PRB}}{N_{Subcarrier}}$$

Where $N_{Subcarrier}$ is the number of (15 kHz) subcarrier used. For example, the DCI indicates the MCS Index and $P_{E\_PRB}$, which would give the TBS as shown in Table 6. If the MCS Index is 7 and the $P_{E\_PRB}=4$, the TBS is 472 bits. Assume the $N_{Subcarrier}$ is also signalled in the DCI and is set to 6 subcarriers, the TTI length (in number of 1 ms subframes) required to carry this transport block is therefore eight subframes. It should be appreciated that $P_{E\_PRB}$ need not be an integer, that is, some new TBS entries can be defined for a fraction of a PRB. Other suitable terms can be used for $P_{E\_PRB}$, for example overall resources required.

TABLE 6

Lookup table for TBS (bits) given the MCS index and Number of equivalent PRBs

| MCS Index | Number of equivalent PRBs, $P_{E\_PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |

In another embodiment, the TTI length is implicitly determined by a combination of different variables defined above. That is the TTI length is determined by MCS, TBS and $N_{Subcarrier}$. That is if the equivalent PRB $P_{E\_PRB}$ is not indicated in the DCI, it can be derived from MCS and TBS (assuming TBS is signalled in the DCI) using a lookup table similar to that in Table 6. Once the $P_{E\_PRB}$ is derived the TTI length can be obtained using one of the above embodiments.

In another embodiment the TTI or BTR for a specific number of subcarriers is an integer multiple of a larger number of subcarriers divided by the allocated number of subcarriers. An example is shown in FIG. 8, where there are 4 possible $N_{Subcarrier}=\{1, 2, 6, 12\}$ transmissions. The TTI (or BTR) of a smaller $N_{Subcarrier}$ is an integer multiple of that of a larger $N_{Subcarrier}$. Here when $N_{Subcarrier}=1$, TTI=12 subframes and when $N_{Subcarrier}=2$, TTI=6 where 12 is integer multiple of 6. This allows UEs using different subcarriers to be aligned in time easily thereby simplifying the operation of the scheduler to allocate the communications resource to the NB-IoT UEs.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in W.

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-I0T," Qualcomm, RAN#69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1#83
[4] 3GPP TS36.213

The following numbered paragraphs provide further example aspects and features of embodiments of the present technique:

Paragraph 1. A communications device configured to transmit signals to and/or receive signals from an infrastructure equipment of a mobile communications network, the communications device comprising a receiver configured to receive signals transmitted by the infrastructure equipment in accordance with a wireless access interface, a transmitter configured to transmit signals to the infrastructure equipment in accordance with the wireless access interface, and a controller configured to control the transmitter and the receiver to transmit data to the infrastructure equipment via an uplink of the wireless access interface or to receive data on the downlink of the wireless access interface, wherein the wireless access interface can provide a plurality of different spacing of subcarriers for transmitting signals representing the data on the uplink or for receiving the signals representing the data on the downlink, and the controller is configured in a combination with the transmitter and the receiver when the infrastructure equipment identifies a requirement to provide communications resources of the wireless access interface on the uplink for the communications device to transmit data to the infrastructure equipment or on the downlink for the communications device to receive data from the infrastructure equipment, to receive an indication on a downlink of the wireless access interface of one of the plurality of different subcarrier spacing which the communications device should use to transmit or to receive the signals representing the data, the indicated subcarrier spacing also determining whether the communications device should use a single subcarrier or multiple subcarriers.

Paragraph 2. A communications device according to paragraph 1, wherein the receiver is configured to receive from the infrastructure equipment an indication of which of the subcarriers of a plurality of available subcarriers, with the indicated subcarrier spacing, the communications device should use to transmit the data to the infrastructure equipment or to receive the data from the infrastructure equipment or which plurality of available subcarriers, with the indicated subcarrier spacing, the communications device should use to transmit or to receive the data, depending on the indicated subcarrier spacing.

Paragraph 3. A communications device according to paragraph 2, wherein the receiver is configured to receive the indication of the subcarrier spacing with the indication of the subcarrier or multiple subcarriers to use in a downlink control message comprising a field indicating the subcarrier spacing and a field indicating the subcarrier or multiple subcarriers to use, and the controller is configured to interpret differently the field indicating which of the subcarrier or multiple subcarriers to use depending upon whether the field indicating the subcarrier spacing indicates a subcarrier spacing which can only be used as a single subcarrier or a subcarrier spacing which can be used as a single or multiple subcarriers.

Paragraph 4. A communications device according to paragraph 3, wherein the field indicating which of the subcarrier or multiple subcarriers to use as a function of the subcarrier spacing is predetermined between the infrastructure equipment and the communications device, which can be represented as a table.

Paragraph 5. A communications device according to paragraph 4, wherein the predetermined interpretation of the field indicating which of the subcarrier or multiple subcarriers to use as a function of the subcarrier spacing is received from the infrastructure equipment as part of broadcast system information.

Paragraph 6. A communications device according to paragraph 3, wherein the downlink control message includes an indication of one or more of a modulation scheme to be used, a coding scheme to be used and a transport block size to be used by the communications device when transmitting the data, and the controller is configured to interpret the indication of one or more of the modulation scheme, the coding scheme and the transport block size to use differently depending on the indicated subcarrier spacing.

Paragraph 7. A communications device according to paragraph 6, wherein the different interpretation of the indication of one or more of the modulation scheme, the coding scheme and the transport block size depending on the indicated subcarrier spacing is received from the infrastructure equipment as part of broadcast system information.

Paragraph 8. A communications device according to paragraphs 1 to 7, wherein the controller is configured with the transmitter and the receiver
  to measure a strength of signals received from the infrastructure equipment via the wireless access interface, and
  to transmit a report of the measurements to the infrastructure equipment, the infrastructure equipment selecting the subcarrier spacing for the communications device based on the received measurement report.

Paragraph 9. A communications device according to paragraphs 3 to 8, wherein the downlink control message is transmitted as part of a random access procedure.

Paragraph 10. A communications device according to paragraphs 1 to 10, wherein the plurality of different spacing of the subcarriers comprises two subcarrier spacing of 3.75 kHz and 15 kHz, and the indication of the 3.75 kHz subcarrier spacing indicates that the communications device should transmit the signals representing the data or receive the signals representing the data on a single subcarrier, and the indication of the 15 kHz subcarrier indicates that the communications device should transmit the signals representing the data or receive the signals representing the data on a single subcarrier or multiple subcarriers.

Paragraph 11. A communications device configured to transmit signals to and/or receive signals from an infrastructure equipment of a mobile communications network, the communications device comprising
  a receiver configured to receive signals transmitted by the infrastructure equipment in accordance with a wireless access interface,
  a transmitter configured to transmit signals to the infrastructure equipment in accordance with the wireless access interface, and
  a controller configured to control the transmitter and the receiver to transmit data to the infrastructure equipment via an uplink of the wireless access interface or to receive data on the downlink of the wireless access interface, wherein the wireless access interface can provide a plurality of different spacing of subcarriers for transmitting signals representing the data on the uplink or for receiving the signals representing the data on the downlink, and the controller is configured in a combination with the transmitter and the receiver
  to select one of a predetermined set of preambles to represent a subcarrier spacing requested by the communications device and a request for a single subcarrier or for multiple subcarriers,
  to transmit as part of a random access procedure the preamble to the infrastructure equipment representing the requested carrier spacing, and
  to configured one of the transmitter to transmit the data on the uplink or the receiver to receive the data on the downlink in accordance with the requested subcarrier spacing.

Paragraph 12. A communications device according to paragraph 11, wherein the controller is configured to select one of the predetermined set of preambles to represent the requested subcarrier spacing and a request for a single subcarrier or for multiple subcarriers depending on the subcarrier spacing requested.

Paragraph 13. A communications device according to paragraph 11 or 12, wherein the controller is configured with the transmitter and the receiver
  to receive a downlink control message allocating communications resources of the uplink or the downlink, the downlink control message including a field indicating frequency resources allocated by the infrastructure equipment on the uplink or the downlink, the controller being configured to interpret differently the field indicating the frequency resources allocated by the infrastructure equipment according to the subcarrier spacing requested by the communications device.

Paragraph 14. A communications device according to paragraphs 11 to 13, wherein the controller is configured with the transmitter and the receiver
  to measure a strength of signals received from the infrastructure equipment via the wireless access interface, and
  to identify the requested subcarrier spacing base on the strength of the signals received from the infrastructure equipment.

Paragraph 15. A communications device according to paragraphs 11 to 14, wherein the plurality of different spacing of the subcarriers comprises two subcarrier spacing of 3.75 kHz and and the indication of the 3.75 kHz subcarrier spacing indicates that the communications device should transmit the signals representing the data or receive the signals representing the data on a single subcarrier, and the indication of the 15 kHz subcarrier indicates that the communications device should transmit the signals representing the data or receive the signals representing the data on a single subcarrier or multiple subcarriers.

Paragraph 16. A method of communicating data to or from a communications device via a mobile communications network, the method comprising
  transmitting signals representing data from the communications device to an infrastructure equipment forming part of a mobile communications network via an uplink of a wireless access interface provided by the infrastructure equipment, or
  receiving signals representing data at the communications device from an infrastructure equipment via a downlink of the wireless access interface, wherein the wireless access interface can provide a plurality of different spacing of subcarriers for transmitting signals representing the data on the uplink or for receiving the signals representing the data on the downlink, and the transmitting or the receiving includes
  when the infrastructure equipment identifies a requirement to provide communications resources of a wireless access interface on the uplink or on the downlink
  receiving an indication on a downlink of the wireless access interface of one of the plurality of different subcarrier spacing which the communications device should use to transmit or to receive the signals representing the data, the indicated subcarrier spacing also determining whether the communications device should use a single subcarrier or multiple subcarriers.

Paragraph 17. A method of communicating data to or from a communications device via a mobile communications network, the method comprising
  transmitting signals representing data from the communications device to an infrastructure equipment forming part of a mobile communications network via an uplink of a wireless access interface provided by the infrastructure equipment, or
  receiving signals representing data at the communications device from an infrastructure equipment via a downlink of the wireless access interface, wherein the wireless access interface can provide a plurality of different spacing of subcarriers for transmitting signals representing the data on the uplink or for receiving the signals representing the data on the downlink, and the transmitting or the receiving includes
  selecting one of a predetermined set of preambles to represent a subcarrier spacing requested by the communications device,
  transmitting as part of a random access procedure the preamble to the infrastructure equipment representing the requested carrier spacing, and
  transmitting the data on the uplink or the receiving the data on the downlink in accordance with the requested subcarrier spacing.

Paragraph 18. An infrastructure equipment forming part of a mobile communications network for transmitting signals to or receiving signals from communications devices, the infrastructure equipment comprising
  a transmitter configured to transmit signals to one or more of the communications devices in accordance with a wireless access interface formed by the infrastructure equipment, and
  a receiver configured to receive signals transmitted by one or more of the communications devices in accordance with the wireless access interface,
  a controller configured to control the transmitter and the receiver to transmit data to one or more of the communications devices via an uplink of the wireless access interface or receive data from the one or more communications devices via a downlink of the wireless access interface, wherein the wireless access interface is provided with a plurality of different spacing of subcarriers for receiving signals representing the data on an uplink from the one or more communications devices or for transmitting signals representing the data on a downlink to the one or more communications devise, and the controller is configured in a combination with the transmitter and the receiver
  to identify a requirement to provide communications resources of the wireless access interface to one of the communications devices on the uplink or on the downlink,
  to select one of the plurality of different subcarrier spacing, the selected subcarrier spacing also determining whether the communications device should use a single subcarrier or multiple subcarriers, and
  to transmit an indication on a downlink of the wireless access interface of one of the plurality of different subcarrier spacing which the communications device should use to transmit or to receive the signals representing the data, the indicated subcarrier spacing also identifying whether the communications device should use a single subcarrier or multiple subcarriers.

Paragraph 19. An infrastructure equipment according to paragraph 18, wherein the controller is configured with the transmitter to transmit to the communications device an indication of which of the subcarriers of a plurality of available subcarriers, with the indicated subcarrier spacing, the communications device should use to transmit signals or to receive signals representing the data or which a plurality of available subcarriers, with the indicated subcarrier spacing, the communications device should use to transmit signals or to receive signals representing the data, depending on the indicated subcarrier spacing.

Paragraph 20. An infrastructure equipment according to paragraph 19, wherein the controller is configured with the transmitter to transmit to the communications device the indication of the subcarrier spacing with the indication of the subcarrier or multiple subcarriers to use in a downlink control message comprising a field indicating the subcarrier spacing and a field indicating the subcarrier or multiple subcarriers to use, and the controller is configured to select the field indicating which of the subcarrier or multiple subcarriers to use differently depending upon whether the field indicating the subcarrier spacing indicates a subcarrier spacing which can only be used as a single subcarrier or a subcarrier spacing which can be used as a single subcarrier or multiple subcarriers.

Paragraph 21. An infrastructure equipment according to paragraph 20, wherein the field indicating which of the subcarrier or multiple subcarriers to use as a function of the subcarrier spacing is predetermined between the infrastructure equipment and the communications device, which can be represented as a table.

Paragraph 22. An infrastructure equipment according to paragraph 20, wherein the controller is configured with the transmitter to transmit the interpretation of the field indicating which of the subcarrier or multiple subcarriers to use as a function of the subcarrier as part of broadcast system information.

Paragraph 23. An infrastructure equipment according to paragraphs 18 to 22, wherein the downlink control message includes an indication of one or more of a modulation scheme to be used, a coding scheme to be used and a transport block size to be used by the communications device when transmitting the data, and the controller is configured to set the indication of one or more of the modulation scheme, the coding scheme and the transport block size to use differently depending on the indicated subcarrier spacing.

Paragraph 24. An infrastructure equipment according to paragraph 23, wherein the controller in combination with the transmitter is configured to transmit the different interpretation of the indication of one or more of the modulation scheme, the coding scheme and the transport block size depending on the indicated subcarrier spacing as part of broadcast system information.

Paragraph 25. An infrastructure equipment according to paragraphs 13 to 19, wherein the controller is configured with the transmitter and the receiver
- to receive a measurement report from the communications device, the measurement report providing an indication of a strength of signals received by the communications device from the infrastructure equipment via the wireless access interface, and
- to select the subcarrier spacing for the communications device based on the received measurement report.

Paragraph 26. An infrastructure equipment according to paragraphs 18 to 25, wherein the downlink control message is a resource allocation message transmitted as part of a random access procedure.

Paragraph 27. An infrastructure equipment according to paragraphs 18 to 26, wherein the plurality of different spacing of the subcarriers comprises two subcarrier spacing of 3.75 kHz and 15 kHz, and the indication of the 3.75 kHz subcarrier spacing indicates that the communications device should transmit the signals or receive the signals representing the data on a single subcarrier, and the indication of the 15 kHz subcarrier indicates that the communications device should transmit the signals representing the data or receive the signals representing the data on a single subcarrier or on multiple subcarriers.

Paragraph 28. An infrastructure equipment forming part of a mobile communications network for transmitting signals to or receiving signals from communications devices, the infrastructure equipment comprising
- a transmitter configured to transmit signals to one or more of the communications devices in accordance with a wireless access interface formed by the infrastructure equipment, and
- a receiver configured to receive signals transmitted by one or more of the communications devices in accordance with the wireless access interface,
- a controller configured to control the transmitter and the receiver to transmit data to one or more of the communications devices via an uplink of the wireless access interface or receive data from the one or more communications devices via a downlink of the wireless access interface, wherein the wireless access interface is provided with a plurality of different spacing of subcarriers for receiving signals representing the data on an uplink from the one or more communications devices or for transmitting signals representing the data on a downlink to the one or more communications devise, and the controller is configured in a combination with the transmitter and the receiver
- to receive a preamble from one of the communications devices as part of a random access procedure requesting communications resources of the wireless access interface on the uplink or on the downlink, using one of the plurality of different subcarrier spacing, the selected subcarrier spacing also determining whether the communications device should use a single subcarrier or multiple subcarriers, and
- to transmit signals on the downlink or to receive signals on the uplink in accordance with the requested carrier spacing.

Paragraph 29. A method of transmitting data from an infrastructure equipment forming part of a mobile communications network to a communications device, or receiving data at the infrastructure equipment from a communications device, the method comprising
- transmitting signals representing the data to the communications device in accordance with a wireless access interface formed by the infrastructure equipment on a downlink of the wireless access interface, or
- receiving signals representing the data transmitted by the communications device in accordance with the wireless access interface, wherein the wireless access interface is provided with a plurality of different spacing of subcarriers for transmitting the signals representing the data on a downlink of the wireless access interface to one or more of the communications devices or receiving the signals representing the data on an uplink from the one or more communications devices, and the transmitting or the receiving includes
- selecting one of the plurality of different subcarrier spacing, the selected subcarrier spacing also determining whether the communications device should use a single subcarrier or multiple subcarriers, and
- transmitting an indication on a downlink of the wireless access interface of one of the plurality of different subcarrier spacing which the communications device should use to transmit the signals representing the data or to receive the signals representing the data, the indicated subcarrier spacing also identifying whether the communications device should use a single subcarrier or multiple subcarriers.

Paragraph 30. A method of transmitting data from an infrastructure equipment forming part of a mobile communications network to a communications device, or receiving data at the infrastructure equipment from a communications device, the method comprising
- transmitting signals representing the data to the communications device in accordance with a wireless access interface formed by the infrastructure equipment on a downlink of the wireless access interface, or
- receiving signals representing the data transmitted by the communications device in accordance with the wireless access interface, wherein the wireless access interface is provided with a plurality of different spacing of subcarriers for transmitting the signals representing the data on a downlink of the wireless access interface to one or more of the communications devices or receiving the signals representing the data on an uplink from the one or more communications devices, and the transmitting or the receiving includes
- to receive a preamble from one of the communications devices as part of a random access procedure requesting communications resources of the wireless access interface on the uplink or on the downlink, using one of the plurality of different subcarrier spacing, the selected subcarrier spacing also determining whether the communications device should use a single subcarrier or multiple subcarriers, and to transmit signals on the downlink or to receive signals on the uplink in accordance with the requested carrier spacing.

Paragraph 31. Circuitry for a communications device for transmitting signals to and/or receiving signals from an infrastructure equipment of a mobile communications network, the circuitry comprising
- receiver circuitry configured to receive signals transmitted by the infrastructure equipment in accordance with a wireless access interface,
- transmitter circuitry configured to transmit signals to the infrastructure equipment in accordance with the wireless access interface, and
- controller circuitry configured to control the transmitter and the receiver to transmit data to the infrastructure equipment via an uplink of the wireless access interface or to receive data on the downlink of the wireless access interface, wherein the wireless access interface can provide a plurality of different spacing of subcarriers for transmitting signals representing the data and the controller circuitry is configured in a combination with the transmitter circuitry and the receiver circuitry
- when the infrastructure equipment identifies a requirement to provide communications resources of the wireless access interface on the uplink for the communications device to transmit data to the infrastructure equipment or on the downlink for the communications device to receive data from the infrastructure equipment, to receive an indication on a downlink of the wireless access interface of one of the plurality of different subcarrier spacing which the communications device should use to transmit or to receive the signals representing the data, the indicated subcarrier spacing also determining whether the communications device should use a single subcarrier or multiple subcarriers.

Paragraph 32. Circuitry for an infrastructure equipment forming part of a communications network, the circuitry comprising
- transmitter circuitry configured to transmit signals to one or more of the communications devices in accordance with a wireless access interface formed by the infrastructure equipment, and
- receiver circuitry configured to receive signals transmitted by one or more of the communications devices in accordance with the wireless access interface,
- controller circuitry configured to control the transmitter and the receiver to transmit data to one or more of the communications devices via an uplink of the wireless access interface or receive data from the one or more communications devices via a downlink of the wireless access interface, wherein the wireless access interface is provided with a plurality of different spacing of subcarriers for receiving signals representing the data on an uplink from the one or more communications devices or for transmitting signals representing the data on a downlink to the one or more communications devise, and the controller circuitry is configured in a combination with the transmitter circuitry and the receiver circuitry
- to identify a requirement to provide communications resources of the wireless access interface to one of the communications devices on the uplink or on the downlink,
- to select one of the plurality of different subcarrier spacing, the selected subcarrier spacing also determining whether the communications device should use a single subcarrier or multiple subcarriers, and
- to transmit an indication on a downlink of the wireless access interface of one of the plurality of different subcarrier spacing which the communications device should use to transmit or to receive the signals representing the data, the indicated subcarrier spacing also identifying whether the communications device should use a single subcarrier or multiple subcarriers.

Paragraph 33. A wireless communications network including an infrastructure equipment according to paragraphs 18 to 28.

Paragraph 34. A communications device configured to transmit signals to and/or receive signals from an infrastructure equipment of a mobile communications network, the communications device comprising
- a receiver configured to receive signals transmitted by the infrastructure equipment in accordance with a wireless access interface,
- a transmitter configured to transmit signals to the infrastructure equipment in accordance with the wireless access interface, and
- a controller configured to control the transmitter and the receiver to transmit data to the infrastructure equipment via an uplink of the wireless access interface or to receive data on the downlink of the wireless access interface, wherein the wireless access interface includes communications resources for allocation to the communications device on the uplink and the downlink, the communications resources comprising frequency resources of a predetermined number of subcarriers, one or more of which can be allocated to the communications device, and time resources in which the wireless access interface is divided into predetermined time units and the controller is configured in a combination with the transmitter and the receiver
- when the infrastructure equipment identifies a requirement to provide communications resources of the wireless access interface on the uplink or on the downlink, to receive an indication on a downlink of the wireless access interface of one or more of the subcarriers allocated to the communications device for receiving or transmitting the data, and a transmission time interval representing a number of the time units within which a transport block of the data is to be transmitted or to be received, and the transmission time interval can vary as a number of the time units.

Paragraph 35. A communications device according to paragraph 34, wherein the receiver is configured to receive the indication of the one or more of the subcarriers allocated to the communications device for receiving or transmitting the data, and the transmission time interval in a downlink control message which includes a field indicating the allocated transmission time interval.

Paragraph 36. A communications device according to paragraph 26 wherein the downlink control message includes an indication of one or more of a modulation scheme to be used, a coding scheme to be used and a transport block size to be used, and the controller is configured to interpret the indication of one or more of the modulation scheme, the coding scheme and the transport block size with the number of the one or more subcarriers allocated to determine the transmission time interval.

Paragraph 37. A communications device according to paragraph 36, wherein the downlink control message includes an indication of an index of a modulation and a coding scheme to be used and an equivalent number of physical resource blocks, and the controller is configured to interpret the indication of the modulation and coding scheme and the equivalent number of physical resource blocks to determine a transport block size, and in combination with the number of the one or more subcarriers allocated to determine the transmission time interval.

Paragraph 38. A communications device according to paragraphs 35 to 37, wherein the transmission time interval is an integer multiple of the time unit and the number of the one or more subcarriers which can be allocated by the infrastructure equipment divided by the allocated number of subcarriers.

Paragraph 39. A communications device according to paragraphs 35 to 38, wherein the transmission time interval varyies as a function of the number of the one or more subcarriers allocated to the communications device for transmitting or receiving.

Paragraph 40. A communications device according to paragraphs 34 to 39, wherein the downlink control message forms part of a resource allocation message or a random access response message.

Paragraph 41. A method of communicating data to or from a communications device via a mobile communications network, the method comprising transmitting signals representing data from the communications device to an infrastructure equipment forming part of a mobile communications network via an uplink of a wireless access interface provided by the infrastructure equipment, or receiving signals representing data at the communications device from an infrastructure equipment via a downlink of the wireless access interface, wherein the transmitting or the receiving includes when the infrastructure equipment identifies a requirement to provide communications resources of a wireless access interface on the uplink or on the downlink, receiving an indication on a downlink of the wireless access interface of one or more of the subcarriers allocated to the communications device for transmitting or receiving the data, and a transmission time interval representing a number of the time units within which a transport block of the data is to be transmitted or to be received, the transmission time interval varying as a number of the time units.

Paragraph 42. A method according to paragraph 41, wherein the transmission time interval varying as a number of the time units comprises varying the transmission time interval as a function of the number of the one or more subcarriers allocated to the communications device for transmitting or receiving.

Paragraph 43. An infrastructure equipment forming part of a mobile communications network for transmitting signals to or receiving signals from communications devices, the infrastructure equipment comprising a transmitter configured to transmit signals to one or more of the communications devices in accordance with a wireless access interface formed by the infrastructure equipment, and a receiver configured to receive signals transmitted by one or more of the communications devices in accordance with the wireless access interface, a controller configured to control the transmitter and the receiver to transmit data to one or more of the communications devices or receive data from the one or more communications devices via the wireless access interface, wherein the wireless access interface includes communications resources for allocation to the communications device on the uplink and the downlink, the communications resources comprising frequency resources of a predetermined number of subcarriers, one or more of which can be allocated to the communications device, and time resources in which the wireless access interface is divided into predetermined time units and the controller is configured in a combination with the transmitter and the receiver to identify a requirement to provide communications resources of the wireless access interface to one of the communications devices on the uplink or on the downlink, to determine a number of the subcarriers of the wireless access interface to be allocated to the communications device, and to determine a transmission time interval for transmitting data to or receiving data from the communications device as a function of the number of the one or more subcarriers allocated to the communications device, and to transmit an indication on a downlink of the wireless access interface of the one or more subcarriers allocated to the communications device for receiving or transmitting the data, and the transmission time interval representing a number of the time units within which a transport block of the data is to be transmitted or to be received, the transmission time interval varying as a number of the time units.

Paragraph 44. A method of transmitting data from an infrastructure equipment forming part of a mobile communications network to a communications device, or receiving data at the infrastructure equipment from a communications device, the method comprising transmitting signals representing the data to the communications device in accordance with a wireless access interface formed by the infrastructure equipment on a downlink of the wireless access interface, or receiving signals representing the data transmitted by the communications device in accordance with the wireless access interface, wherein the wireless access interface includes communications resources for allocation to the communications device on the uplink and the downlink, the communications resources comprising frequency resources of a predetermined number of subcarriers, one or more of which can be allocated to the communications device, and time resources in which the wireless access interface is divided into predetermined time units and the transmitting or the receiving the signals representing the data includes identifying a requirement to provide communications resources of the wireless access interface to one of the communications devices on the uplink or on the downlink, determining a number of the subcarriers of the wireless access interface to be allocated to the communications device, and determining a transmission time interval for transmitting data to or receiving data from the communications device as a function of the number of the one or more subcarriers allocated to the communications device, and transmitting an indication on a downlink of the wireless access interface of the one or more subcarriers allocated to the communications device for receiving or transmitting the data, and the transmission time interval representing a number of the time units within which a transport block of the data is to be transmitted or to be received, the transmission time interval varying as a number of the time units.

The invention claimed is:

1. Infrastructure equipment forming part of a mobile communications network, the infrastructure equipment comprising:
  circuitry configured to
    transmit data to a communications device via an uplink of a wireless access interface or receive data from the communications device via a downlink of the wireless access interface, wherein the wireless access interface is provided with a plurality of different spacing of subcarriers for receiving signals representing the data on an uplink from the communications device or for transmitting signals representing the data on a downlink to the communications device;
    select one of the plurality of different subcarrier spacing to provide communications resources of the wireless access interface to the communications device on the uplink or downlink, the selected subcarrier spacing indicating whether the communications device should use a single subcarrier or multiple subcarriers; and
    transmit an indication on a downlink of the wireless access interface of one of the plurality of different subcarrier spacing which the communications device should use to transmit or to receive the signals representing the data.

2. The infrastructure equipment of claim 1, wherein the indicated subcarrier spacing indicates whether the communications device should use a single subcarrier or multiple subcarriers.

3. The infrastructure equipment of claim 1, wherein the circuitry is configured to transmit to the communications device an indication of which of the subcarriers of a plurality of available subcarriers, with the indicated subcarrier spacing, the communications device should use to transmit signals or to receive signals representing the data or which a plurality of available subcarriers, with the indicated subcarrier spacing, the communications device should use to transmit signals or to receive signals representing the data, depending on the indicated subcarrier spacing.

4. The infrastructure equipment of claim 1, wherein the circuitry is configured to transmit to the communications device the indication of the subcarrier spacing with the indication of the subcarrier or multiple subcarriers to use in a downlink control message comprising a field indicating the subcarrier spacing and a field indicating the subcarrier or multiple subcarriers to use.

5. The infrastructure equipment of claim 4, wherein the circuitry is configured to select the field indicating which of the subcarrier or multiple subcarriers to use differently depending upon whether the field indicating the subcarrier spacing indicates a subcarrier spacing which can only be used as a single subcarrier or a subcarrier spacing which can be used as a single subcarrier or multiple subcarriers.

6. The infrastructure equipment of claim 5, wherein the field indicating which of the subcarrier or multiple subcarriers to use as a function of the subcarrier spacing is predetermined between the infrastructure equipment and the communications device, which can be represented as a table.

7. The infrastructure equipment of claim 5, wherein the circuitry is configured to transmit an interpretation of the field indicating which of the subcarrier or multiple subcarriers to use as a function of the subcarrier as part of broadcast system information.

8. The infrastructure equipment of claim 1, wherein the circuitry is configured to transmit the indication of the one of the plurality of different subcarrier spacing which the communications device should use to transmit or to receive the signals representing the data in a downlink control message.

9. The infrastructure equipment of claim 8, wherein the downlink control message includes an indication of one or more of a modulation scheme to be used, a coding scheme to be used and a transport block size to be used by the communications device when transmitting the data.

10. The infrastructure equipment of claim 9, wherein the circuitry is configured to set the indication of one or more of the modulation scheme, the coding scheme and the transport block size to use differently depending on the indicated subcarrier spacing.

11. The infrastructure equipment of claim 10, wherein the circuitry is configured to transmit a different interpretation of the indication of one or more of the modulation scheme, the coding scheme and the transport block size depending on the indicated subcarrier spacing as part of broadcast system information.

12. The infrastructure equipment of claim 8, wherein the downlink control message is a resource allocation message transmitted as part of a random access procedure.

13. The infrastructure equipment of claim 1, wherein the circuitry is configured to receive a measurement report from the communications device, the measurement report providing an indication of a strength of signals received by the communications device from the infrastructure equipment via the wireless access interface.

14. The infrastructure equipment of claim 13, wherein the circuitry is configured to select the subcarrier spacing for the communications device based on the received measurement report.

15. The infrastructure equipment of claim 1, wherein the plurality of different spacing of the subcarriers comprises two subcarrier spacing of 3.75 kHz and 15kHz.

16. The infrastructure equipment of claim 15, wherein the indication of the 3.75 kHz subcarrier spacing indicates that the communications device should transmit the signals or receive the signals representing the data on a single subcarrier.

17. The infrastructure equipment of claim 15, wherein the indication of the 15 kHz subcarrier indicates that the communications device should transmit the signals representing the data or receive the signals representing the data on a single subcarrier or on multiple subcarriers.

18. The infrastructure equipment of claim 1, wherein the circuitry includes:
  a transmitter configured to transmit signals to the communications device in accordance with the wireless access interface; and
  a receiver configured to receive signals transmitted by the communications device in accordance with the wireless access interface.

19. Circuitry for infrastructure equipment forming part of a mobile communications network, the circuitry configured to:

transmit data to a communications device via an uplink of a wireless access interface or receive data from the communications device via a downlink of the wireless access interface, wherein the wireless access interface is provided with a plurality of different spacing of subcarriers for receiving signals representing the data on an uplink from the communications device or for transmitting signals representing the data on a downlink to the communications device;

select one of the plurality of different subcarrier spacing to provide communications resources of the wireless access interface to the communications device on the uplink or downlink, the selected subcarrier spacing indicating whether the communications device should use a single subcarrier or multiple subcarriers; and transmit an indication on a downlink of the wireless access interface of one of the plurality of different subcarrier spacing which the communications device should use to transmit or to receive the signals representing the data.

20. Infrastructure equipment forming part of a mobile communications network, the infrastructure equipment comprising:

circuitry configured to transmit data to a communications device via an uplink of a wireless access interface or receive data from the communications device via a downlink of the wireless access interface, wherein the wireless access interface is provided with a plurality of different spacing of subcarriers for receiving signals representing the data on an uplink from the communications device or for transmitting signals representing the data on a downlink to the communications device;

receive a preamble from the communications device as part of a random access procedure requesting communications resources of the wireless access interface on the uplink or on the downlink, using one of the plurality of different subcarrier spacing, the selected subcarrier spacing also determining whether the communications device should use a single subcarrier or multiple subcarriers; and transmit signals on the downlink or to receive signals on the uplink in accordance with the requested carrier spacing.

* * * * *